United States Patent
Beaver et al.

(10) Patent No.: US 9,971,502 B2
(45) Date of Patent: *May 15, 2018

(54) TOUCH EVENT MODEL

(71) Applicant: Apple Inc., Cupertino, CA (US)

(72) Inventors: Jason Clay Beaver, San Jose, CA (US); Andrew Platzer, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/432,746

(22) Filed: Feb. 14, 2017

(65) Prior Publication Data

US 2017/0160925 A1    Jun. 8, 2017

Related U.S. Application Data

(63) Continuation of application No. 15/197,704, filed on Jun. 29, 2016, which is a continuation of application
(Continued)

(51) Int. Cl.
*G06F 3/0488* (2013.01)
*G06F 3/01* (2006.01)
(Continued)

(52) U.S. Cl.
CPC .......... *G06F 3/04886* (2013.01); *G06F 3/017* (2013.01); *G06F 3/041* (2013.01);
(Continued)

(58) Field of Classification Search
CPC ... G06F 3/00; G06F 3/01; G06F 3/017; G06F 3/033; G06F 3/041; G06F 3/048;
(Continued)

(56) References Cited

U.S. PATENT DOCUMENTS 4,455,452 A    6/1984   Schuyler
4,674,066 A    6/1987   Kucera
(Continued)

FOREIGN PATENT DOCUMENTS

AU    2007283771        4/2007
CA    2755443  A1    9/2010
(Continued)

OTHER PUBLICATIONS

Office Action, dated Dec. 9, 2011, received in U.S. Appl. No. 12/566,660, 6 pages.
(Continued)

*Primary Examiner* — Xiomar L Bautista
(74) *Attorney, Agent, or Firm* — Morgan, Lewis & Bockius LLP

(57) ABSTRACT

A device with a touch-sensitive surface detects one or more touches that start within a view on the touch-sensitive surface, and processes the one or more touches on the touch-sensitive surface with a software element associated with the view. The device receives, at the software element associated with the view, a touch event that includes data structure including a phase value indicating that a respective touch on the touch-sensitive surface has been canceled by the device. The device responds to receiving the touch event by ignoring the respective touch on the touch-sensitive surface.

24 Claims, 6 Drawing Sheets

Related U.S. Application Data

No. 14/171,680, filed on Feb. 3, 2014, now Pat. No. 9,389,712, which is a continuation of application No. 12/042,318, filed on Mar. 4, 2008, now Pat. No. 8,645,827.

(51) Int. Cl.
  *G06F 3/041* (2006.01)
  *G06F 3/0481* (2013.01)
  *G06F 3/0482* (2013.01)

(52) U.S. Cl.
  CPC .......... *G06F 3/0416* (2013.01); *G06F 3/0481* (2013.01); *G06F 3/0488* (2013.01); *G06F 3/04883* (2013.01); *G06F 3/0482* (2013.01); *G06F 2203/04104* (2013.01); *G06F 2203/04803* (2013.01); *G06F 2203/04808* (2013.01)

(58) Field of Classification Search
  CPC .... G06F 3/0481; G06F 3/0482; G06F 3/0484; G06F 3/0488
  See application file for complete search history.

(56) References Cited

U.S. PATENT DOCUMENTS

| | | |
|---|---|---|
| 5,046,434 A | 9/1991 | Breezer et al. |
| 5,233,547 A | 8/1993 | Kapp et al. |
| 5,252,951 A | 10/1993 | Tannenbaum et al. |
| 5,454,960 A | 10/1995 | Newsom |
| 5,463,725 A | 10/1995 | Henckel et al. |
| 5,488,204 A | 1/1996 | Mead et al. |
| 5,495,566 A | 2/1996 | Kwatinez |
| 5,513,309 A | 4/1996 | Meier et al. |
| 5,530,861 A | 6/1996 | Diamant et al. |
| 5,534,893 A | 7/1996 | Hansen, Jr. et al. |
| 5,564,112 A | 10/1996 | Hayes et al. |
| 5,566,337 A | 10/1996 | Szymanski et al. |
| 5,570,113 A * | 10/1996 | Zetts .................. G06F 3/04883 345/156 |
| 5,583,543 A | 12/1996 | Takahashi et al. |
| 5,589,856 A | 12/1996 | Stein et al. |
| 5,612,719 A | 3/1997 | Beernick et al. |
| 5,627,567 A | 5/1997 | Davidson |
| 5,627,959 A | 5/1997 | Brown et al. |
| 5,676,064 A | 10/1997 | Shuert |
| 5,686,940 A | 11/1997 | Kuga |
| 5,698,822 A | 12/1997 | Haneda et al. |
| 5,708,460 A | 1/1998 | Young et al. |
| 5,745,116 A | 4/1998 | Pisthua-Arnond |
| 5,777,605 A | 4/1998 | Yoshinobu et al. |
| 5,798,752 A | 8/1998 | Buxton et al. |
| 5,818,455 A | 10/1998 | Stone et al. |
| 5,844,547 A | 12/1998 | Minakuchi et al. |
| 5,854,853 A | 12/1998 | Wang |
| 5,864,636 A | 1/1999 | Chisaka |
| 5,867,158 A | 2/1999 | Murasaki et al. |
| 5,880,411 A | 3/1999 | Gillespie et al. |
| 5,903,902 A | 5/1999 | Orr et al. |
| 5,917,477 A | 6/1999 | Lee |
| 5,959,629 A | 9/1999 | Masui |
| 6,028,602 A | 2/2000 | Weidenfeller et al. |
| 6,034,688 A | 3/2000 | Greenwood et al. |
| 6,035,343 A | 3/2000 | Tsushima et al. |
| 6,061,063 A | 5/2000 | Wagner et al. |
| 6,089,371 A | 7/2000 | Lin |
| 6,141,018 A | 10/2000 | Beri et al. |
| 6,188,391 B1 | 2/2001 | Seely et al. |
| 6,259,436 B1 | 7/2001 | Moon et al. |
| 6,323,846 B1 | 11/2001 | Westerman et al. |
| 6,369,821 B2 | 4/2002 | Merrill et al. |
| 6,377,965 B1 | 4/2002 | Hachamovitch et al. |
| 6,446,083 B1 | 9/2002 | Leight et al. |
| 6,448,986 B1 | 9/2002 | Smith |
| 6,486,896 B1 | 11/2002 | Ubillos |
| 6,489,951 B1 | 12/2002 | Wong et al. |
| 6,498,590 B1 | 12/2002 | Dietz et al. |
| 6,559,869 B1 | 5/2003 | Lui et al. |
| 6,567,102 B2 | 5/2003 | Kung |
| 6,570,557 B1 * | 5/2003 | Westerman ......... G06F 3/04883 341/22 |
| 6,570,594 B1 | 5/2003 | Wagner |
| 6,590,595 B1 | 7/2003 | Wagner et al. |
| 6,628,835 B1 | 9/2003 | Brill |
| 6,631,501 B1 | 10/2003 | Jurion et al. |
| 6,636,242 B2 | 10/2003 | Bowman-Amuah |
| 6,639,584 B1 | 10/2003 | Li |
| 6,661,409 B2 | 12/2003 | DeMartines et al. |
| 6,664,989 B1 | 12/2003 | Snyder et al. |
| 6,664,991 B1 * | 12/2003 | Chew .................. G06F 3/04883 715/812 |
| 6,677,932 B1 | 1/2004 | Westerman |
| 6,677,965 B1 | 1/2004 | Ullmann et al. |
| 6,690,387 B2 | 2/2004 | Zimmerman et al. |
| 6,707,449 B2 | 3/2004 | Hinckley et al. |
| 6,714,936 B1 | 3/2004 | Nevin, III |
| 6,735,583 B1 | 5/2004 | Bjarnestam et al. |
| 6,741,996 B1 | 5/2004 | Brechner et al. |
| 6,757,673 B2 | 6/2004 | Makus et al. |
| 6,765,557 B1 | 7/2004 | Segal et al. |
| 6,778,992 B1 | 8/2004 | Searle et al. |
| 6,809,724 B1 | 10/2004 | Shiraishi et al. |
| 6,819,315 B2 | 11/2004 | Toepke et al. |
| 6,820,237 B1 | 11/2004 | Abu-Hakima et al. |
| 6,831,631 B2 | 12/2004 | Chuang |
| 6,839,721 B2 | 1/2005 | Schwols |
| 6,856,326 B1 | 2/2005 | Zhai |
| 6,868,383 B1 | 3/2005 | Bangalore et al. |
| 6,903,927 B2 | 6/2005 | Anlauff |
| 6,907,575 B2 | 6/2005 | Duarte |
| 6,912,462 B2 | 6/2005 | Ogaki |
| 6,957,392 B2 | 10/2005 | Simister et al. |
| 6,958,749 B1 | 10/2005 | Matsushita |
| 6,963,937 B1 | 11/2005 | Kamper et al. |
| 6,972,776 B2 | 12/2005 | Davis et al. |
| 6,975,306 B2 | 12/2005 | Hinckley et al. |
| 6,985,137 B2 | 1/2006 | Kaikuranta |
| 6,985,178 B1 | 1/2006 | Morita et al. |
| 7,009,599 B2 | 3/2006 | Pihlaja |
| 7,009,626 B2 | 3/2006 | Anwar |
| 7,013,435 B2 | 3/2006 | Gallo et al. |
| 7,023,427 B2 | 4/2006 | Kraus et al. |
| 7,030,861 B1 | 4/2006 | Westerman et al. |
| 7,030,863 B2 | 4/2006 | Longe et al. |
| 7,046,230 B2 | 5/2006 | Zadesky et al. |
| 7,062,090 B2 | 6/2006 | Simmons et al. |
| 7,075,512 B1 | 7/2006 | Fabre et al. |
| 7,084,859 B1 | 8/2006 | Pryor |
| 7,088,374 B2 | 8/2006 | David et al. |
| 7,102,626 B2 | 9/2006 | Denny, III |
| 7,117,453 B2 | 10/2006 | Drucker et al. |
| 7,152,210 B1 | 12/2006 | Van Den Hoven et al. |
| 7,154,534 B2 | 12/2006 | Seki et al. |
| 7,155,048 B2 | 12/2006 | Ohara |
| 7,173,623 B2 | 2/2007 | Calkins et al. |
| 7,181,373 B2 | 2/2007 | Le Cocq et al. |
| 7,184,796 B2 | 2/2007 | Karidis et al. |
| 7,237,199 B1 | 6/2007 | Menhardt et al. |
| 7,240,291 B2 | 7/2007 | Card et al. |
| 7,337,412 B2 | 2/2008 | Guido et al. |
| 7,346,850 B2 | 3/2008 | Swartz et al. |
| 7,358,965 B2 | 4/2008 | Barabe et al. |
| 7,385,592 B2 | 6/2008 | Collins |
| 7,406,696 B2 | 7/2008 | Burger et al. |
| 7,420,543 B2 | 9/2008 | Jayachandra |
| 7,469,381 B2 | 12/2008 | Ording |
| 7,487,447 B1 | 2/2009 | Jerger |
| 7,499,027 B2 | 3/2009 | Brigham, II et al. |
| 7,561,159 B2 | 7/2009 | Abel et al. |
| 7,564,448 B2 | 7/2009 | Yi |
| 7,576,732 B2 | 8/2009 | Lii |
| 7,614,008 B2 | 11/2009 | Ording |
| 7,653,883 B2 | 1/2010 | Hotelling et al. |

(56) References Cited

U.S. PATENT DOCUMENTS

| | | |
|---|---|---|
| 7,663,607 B2 | 2/2010 | Hotelling et al. |
| 7,673,255 B2 | 3/2010 | Schechter et al. |
| 7,724,242 B2 | 5/2010 | Hillis et al. |
| 7,739,604 B1 | 6/2010 | Lyons et al. |
| 7,750,893 B2 | 7/2010 | Hashimoto et al. |
| 7,761,541 B1 | 7/2010 | Morley et al. |
| 7,778,818 B2 | 8/2010 | Longe et al. |
| 7,782,307 B2 | 8/2010 | Westerman et al. |
| 7,786,975 B2 | 8/2010 | Ording et al. |
| 7,812,826 B2 | 10/2010 | Ording et al. |
| 7,843,427 B2 | 11/2010 | Ording et al. |
| 7,844,915 B2 | 11/2010 | Platzer et al. |
| 7,864,037 B2 | 1/2011 | Miller |
| 7,872,652 B2 | 1/2011 | Platzer et al. |
| 7,900,156 B2 | 3/2011 | Andre et al. |
| 7,903,115 B2 | 3/2011 | Platzer et al. |
| 7,907,125 B2 | 3/2011 | Weiss et al. |
| 7,917,584 B2 | 3/2011 | Arthursson |
| 7,925,996 B2 | 4/2011 | Hofmeister et al. |
| 7,941,760 B2 | 5/2011 | Kocienda et al. |
| 7,962,862 B2 | 6/2011 | Kulp et al. |
| 7,966,578 B2 | 6/2011 | Tolmasky et al. |
| 8,051,406 B2 | 11/2011 | Knight et al. |
| 8,091,045 B2 | 1/2012 | Christie et al. |
| 8,112,299 B2 | 2/2012 | Kim et al. |
| 8,115,744 B2 | 2/2012 | Kong et al. |
| 8,135,171 B2 | 3/2012 | Ho et al. |
| 8,140,570 B2 | 3/2012 | Ingrassia et al. |
| 8,171,432 B2 | 5/2012 | Matas et al. |
| 8,174,502 B2 | 5/2012 | Bolsinga et al. |
| 8,214,768 B2 | 7/2012 | Boule et al. |
| 8,239,784 B2 | 8/2012 | Hotelling et al. |
| 8,253,695 B2 | 8/2012 | Ganatra et al. |
| 8,285,499 B2 | 10/2012 | Moore et al. |
| 8,289,289 B2 | 10/2012 | Rimon et al. |
| 8,291,344 B2 | 10/2012 | Chaudhri |
| 8,296,332 B2 | 10/2012 | Boley et al. |
| 8,310,459 B2 | 11/2012 | Nurmi |
| 8,314,775 B2 | 11/2012 | Westerman et al. |
| 8,400,416 B2 | 3/2013 | Ho et al. |
| 8,416,196 B2 | 4/2013 | Williamson et al. |
| 8,428,893 B2 | 4/2013 | Moore et al. |
| 8,434,003 B2 | 4/2013 | Zalewski et al. |
| 8,436,815 B2 | 5/2013 | Mazeev et al. |
| 8,436,821 B1 | 5/2013 | Plitchta et al. |
| 8,489,783 B2 | 7/2013 | Wilson |
| 8,560,975 B2 | 10/2013 | Beaver et al. |
| 8,566,044 B2 | 10/2013 | Shaffer et al. |
| 8,566,045 B2 | 10/2013 | Shaffer et al. |
| 8,570,277 B2 | 10/2013 | Rekimoto |
| 8,645,827 B2 | 2/2014 | Beaver et al. |
| 8,656,311 B1 | 2/2014 | Harper et al. |
| 8,676,824 B2 | 3/2014 | Tavor |
| 8,682,602 B2 | 3/2014 | Moore et al. |
| 8,775,820 B1 | 7/2014 | Freeburne |
| 9,285,908 B2 | 3/2016 | Moore et al. |
| 9,720,594 B2 | 8/2017 | Beaver et al. |
| 2001/0009033 A1 | 7/2001 | Morisaki et al. |
| 2001/0011998 A1 | 8/2001 | Agata et al. |
| 2001/0012001 A1 | 8/2001 | Rekimoto et al. |
| 2001/0028369 A1 | 10/2001 | Gallo et al. |
| 2001/0045949 A1 | 11/2001 | Chithambaram et al. |
| 2002/0015024 A1 | 2/2002 | Westerman et al. |
| 2002/0015064 A1 | 2/2002 | Robotham et al. |
| 2002/0025024 A1 | 2/2002 | Tybinkowski et al. |
| 2002/0036618 A1 | 3/2002 | Wakai et al. |
| 2002/0101418 A1 | 8/2002 | Vernier et al. |
| 2002/0191029 A1 | 12/2002 | Gillespie et al. |
| 2002/0194589 A1 | 12/2002 | Cristofalo et al. |
| 2003/0063073 A1 | 4/2003 | Geaghan et al. |
| 2003/0071850 A1 | 4/2003 | Geidl |
| 2003/0071858 A1 | 4/2003 | Morohoshi |
| 2003/0080946 A1 | 5/2003 | Chuang |
| 2003/0095096 A1 | 5/2003 | Robbin et al. |
| 2003/0095135 A1 | 5/2003 | Kaasila et al. |
| 2003/0095697 A1 | 5/2003 | Wood et al. |
| 2003/0122787 A1 | 7/2003 | Zimmerman et al. |
| 2003/0132959 A1 | 7/2003 | Simister et al. |
| 2003/0146941 A1 | 8/2003 | Bailey et al. |
| 2003/0160832 A1 | 8/2003 | Ridgley et al. |
| 2003/0174149 A1 | 9/2003 | Fujisaki et al. |
| 2003/0184525 A1 | 10/2003 | Tsai |
| 2003/0197689 A1 | 10/2003 | May |
| 2003/0197744 A1 | 10/2003 | Irvine |
| 2003/0210258 A1 | 11/2003 | Williams |
| 2003/0214531 A1 | 11/2003 | Chambers et al. |
| 2003/0222917 A1 | 12/2003 | Trantow |
| 2004/0001627 A1 | 1/2004 | Simmons et al. |
| 2004/0021676 A1 | 2/2004 | Chen et al. |
| 2004/0021698 A1 | 2/2004 | Baldwin et al. |
| 2004/0025115 A1 | 2/2004 | Sienel et al. |
| 2004/0027398 A1 | 2/2004 | Jaeger |
| 2004/0030914 A1 | 2/2004 | Kelley et al. |
| 2004/0039474 A1 | 2/2004 | Kontani |
| 2004/0070573 A1 | 4/2004 | Graham |
| 2004/0080541 A1 | 4/2004 | Saiga et al. |
| 2004/0095387 A1 | 5/2004 | Demsey et al. |
| 2004/0100479 A1 | 5/2004 | Nakano et al. |
| 2004/0111672 A1 | 6/2004 | Bowman et al. |
| 2004/0125136 A1 | 7/2004 | Wallenius |
| 2004/0135817 A1 | 7/2004 | Daughtery et al. |
| 2004/0155888 A1 | 8/2004 | Padgitt et al. |
| 2004/0160419 A1 | 8/2004 | Padgitt |
| 2004/0189721 A1 | 9/2004 | Pettiross et al. |
| 2004/0207542 A1 | 10/2004 | Chang et al. |
| 2004/0210847 A1 | 10/2004 | Berson et al. |
| 2004/0215643 A1 | 10/2004 | Brechner et al. |
| 2004/0221168 A1 | 11/2004 | Girard |
| 2004/0222992 A1 | 11/2004 | Calkins et al. |
| 2004/0224638 A1 | 11/2004 | Fadell et al. |
| 2004/0225965 A1 | 11/2004 | Garside et al. |
| 2004/0263486 A1 | 12/2004 | Seni |
| 2005/0005241 A1 | 1/2005 | Hunleth et al. |
| 2005/0008343 A1 | 1/2005 | Frohlich et al. |
| 2005/0012723 A1 | 1/2005 | Pallakoff |
| 2005/0017957 A1* | 1/2005 | Yi .................... G06F 3/04886 345/173 |
| 2005/0024341 A1 | 2/2005 | Gillespie et al. |
| 2005/0027666 A1 | 2/2005 | Beck, Jr. et al. |
| 2005/0057524 A1 | 3/2005 | Hill et al. |
| 2005/0088443 A1 | 4/2005 | Blanco et al. |
| 2005/0122806 A1 | 6/2005 | Arakawa et al. |
| 2005/0145807 A1 | 7/2005 | Lapstun et al. |
| 2005/0162402 A1 | 7/2005 | Watanachote |
| 2005/0168488 A1 | 8/2005 | Montague |
| 2005/0179648 A1 | 8/2005 | Barabe et al. |
| 2005/0183035 A1 | 8/2005 | Ringel et al. |
| 2005/0193015 A1 | 9/2005 | Logston et al. |
| 2005/0195154 A1 | 9/2005 | Robbins et al. |
| 2005/0198588 A1 | 9/2005 | Lin et al. |
| 2005/0210419 A1 | 9/2005 | Kela et al. |
| 2005/0237308 A1 | 10/2005 | Autio et al. |
| 2005/0268247 A1 | 12/2005 | Baneth |
| 2005/0270269 A1 | 12/2005 | Tokkonen |
| 2005/0275618 A1 | 12/2005 | Juh et al. |
| 2005/0275636 A1 | 12/2005 | Dehlin et al. |
| 2006/0010400 A1* | 1/2006 | Dehlin .................. G06F 3/0354 715/856 |
| 2006/0022956 A1 | 2/2006 | Lengeling et al. |
| 2006/0025218 A1 | 2/2006 | Hotta |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0026676 A1 | 2/2006 | O'Donoghue |
| 2006/0028455 A1 | 2/2006 | Hinckley et al. |
| 2006/0031786 A1 | 2/2006 | Hillis et al. |
| 2006/0036955 A1 | 2/2006 | Baudisch et al. |
| 2006/0038796 A1 | 2/2006 | Hinckley et al. |
| 2006/0048073 A1 | 3/2006 | Jarrett et al. |
| 2006/0055662 A1 | 3/2006 | Rimas-Ribikauskas et al. |
| 2006/0055669 A1 | 3/2006 | Das |
| 2006/0055789 A1 | 3/2006 | Jin et al. |
| 2006/0061551 A1 | 3/2006 | Fateh |
| 2006/0066588 A1 | 3/2006 | Lyon et al. |

(56) References Cited

U.S. PATENT DOCUMENTS

| | | |
|---|---|---|
| 2006/0077183 A1 | 4/2006 | Studt |
| 2006/0077544 A1 | 4/2006 | Stark |
| 2006/0082549 A1 | 4/2006 | Hoshino et al. |
| 2006/0094502 A1 | 5/2006 | Katayama et al. |
| 2006/0097991 A1 | 5/2006 | Hotelling et al. |
| 2006/0112335 A1* | 5/2006 | Hofmeister ........... G06F 3/0488 715/701 |
| 2006/0123353 A1 | 6/2006 | Matthews et al. |
| 2006/0125799 A1 | 6/2006 | Hillis et al. |
| 2006/0125803 A1 | 6/2006 | Westerman et al. |
| 2006/0136833 A1 | 6/2006 | Dettinger et al. |
| 2006/0156249 A1 | 7/2006 | Blythe et al. |
| 2006/0161871 A1 | 7/2006 | Hotelling et al. |
| 2006/0176403 A1 | 8/2006 | Gritton et al. |
| 2006/0181510 A1 | 8/2006 | Faith |
| 2006/0187215 A1 | 8/2006 | Rosenberg et al. |
| 2006/0190833 A1 | 8/2006 | SanGiovanni et al. |
| 2006/0197753 A1 | 9/2006 | Hotelling |
| 2006/0221061 A1 | 10/2006 | Fry |
| 2006/0236263 A1 | 10/2006 | Bathiche et al. |
| 2006/0238495 A1 | 10/2006 | Davis |
| 2006/0242602 A1 | 10/2006 | Schechter et al. |
| 2006/0242607 A1 | 10/2006 | Hudson |
| 2006/0247915 A1 | 11/2006 | Bradford et al. |
| 2006/0262104 A1 | 11/2006 | Sullivan et al. |
| 2006/0262136 A1 | 11/2006 | Vaisanen |
| 2006/0274042 A1 | 12/2006 | Krah et al. |
| 2006/0279548 A1 | 12/2006 | Geaghan |
| 2006/0284792 A1 | 12/2006 | Foxlin |
| 2006/0288313 A1 | 12/2006 | Hillis |
| 2007/0008066 A1 | 1/2007 | Fukuda |
| 2007/0013697 A1 | 1/2007 | Gilboa |
| 2007/0024646 A1 | 2/2007 | Saarinen et al. |
| 2007/0036346 A1 | 2/2007 | Kwon |
| 2007/0046643 A1 | 3/2007 | Hillis et al. |
| 2007/0050469 A1 | 3/2007 | Gupta et al. |
| 2007/0055967 A1 | 3/2007 | Poff et al. |
| 2007/0061126 A1 | 3/2007 | Russo et al. |
| 2007/0064004 A1 | 3/2007 | Bonner et al. |
| 2007/0067745 A1 | 3/2007 | Choi et al. |
| 2007/0075965 A1 | 4/2007 | Huppi et al. |
| 2007/0081726 A1 | 4/2007 | Westerman et al. |
| 2007/0089069 A1 | 4/2007 | Hsieh et al. |
| 2007/0094352 A1 | 4/2007 | Choi et al. |
| 2007/0109275 A1 | 5/2007 | Chuang |
| 2007/0120835 A1 | 5/2007 | Sato |
| 2007/0132789 A1 | 6/2007 | Ording et al. |
| 2007/0149252 A1 | 6/2007 | Jobs et al. |
| 2007/0150826 A1 | 6/2007 | Anzures et al. |
| 2007/0150842 A1 | 6/2007 | Chaudhri et al. |
| 2007/0152976 A1 | 7/2007 | Townsend et al. |
| 2007/0152978 A1 | 7/2007 | Kocienda et al. |
| 2007/0152979 A1 | 7/2007 | Jobs et al. |
| 2007/0152983 A1 | 7/2007 | McKillop et al. |
| 2007/0152984 A1 | 7/2007 | Ording et al. |
| 2007/0155434 A1 | 7/2007 | Jobs et al. |
| 2007/0156364 A1 | 7/2007 | Rothkopf |
| 2007/0157089 A1 | 7/2007 | van Os et al. |
| 2007/0174257 A1 | 7/2007 | Howard |
| 2007/0176903 A1 | 8/2007 | Dahlin et al. |
| 2007/0177803 A1 | 8/2007 | Elias et al. |
| 2007/0177804 A1 | 8/2007 | Elias et al. |
| 2007/0185876 A1 | 8/2007 | Mendis et al. |
| 2007/0198926 A1 | 8/2007 | Joguet et al. |
| 2007/0214436 A1 | 9/2007 | Myers |
| 2007/0214462 A1 | 9/2007 | Boillot |
| 2007/0226636 A1 | 9/2007 | Carpenter et al. |
| 2007/0236472 A1 | 10/2007 | Bentsen et al. |
| 2007/0242056 A1 | 10/2007 | Engelhardt et al. |
| 2007/0242607 A1 | 10/2007 | Sadler et al. |
| 2007/0247435 A1 | 10/2007 | Benko et al. |
| 2007/0247442 A1 | 10/2007 | Andre et al. |
| 2007/0252821 A1 | 11/2007 | Hollemans et al. |
| 2007/0262964 A1 | 11/2007 | Zotov et al. |
| 2007/0277124 A1* | 11/2007 | Shin .................... G06F 3/04883 715/863 |
| 2007/0288856 A1 | 12/2007 | Butlin et al. |
| 2007/0291009 A1 | 12/2007 | Wright et al. |
| 2008/0001923 A1 | 1/2008 | Hall et al. |
| 2008/0005703 A1 | 1/2008 | Radivojevic et al. |
| 2008/0012835 A1 | 1/2008 | Rimon et al. |
| 2008/0016096 A1 | 1/2008 | Wilding et al. |
| 2008/0027642 A1 | 1/2008 | Winberry et al. |
| 2008/0028327 A1 | 1/2008 | Hirota et al. |
| 2008/0034029 A1 | 2/2008 | Fang et al. |
| 2008/0036743 A1 | 2/2008 | Westerman et al. |
| 2008/0041640 A1 | 2/2008 | Gillespie et al. |
| 2008/0043020 A1 | 2/2008 | Snow et al. |
| 2008/0048978 A1 | 2/2008 | Trent, Jr. et al. |
| 2008/0072143 A1 | 3/2008 | Assadollahi |
| 2008/0094356 A1 | 4/2008 | Ording et al. |
| 2008/0094368 A1 | 4/2008 | Ording et al. |
| 2008/0104544 A1 | 5/2008 | Collins et al. |
| 2008/0114614 A1 | 5/2008 | Mahesh et al. |
| 2008/0120576 A1 | 5/2008 | Kariathungal et al. |
| 2008/0122806 A1 | 5/2008 | Ahn |
| 2008/0158170 A1 | 7/2008 | Herz et al. |
| 2008/0158191 A1 | 7/2008 | Yang et al. |
| 2008/0162751 A1 | 7/2008 | Wilson |
| 2008/0165022 A1 | 7/2008 | Herz et al. |
| 2008/0165132 A1 | 7/2008 | Weiss et al. |
| 2008/0165136 A1 | 7/2008 | Christie et al. |
| 2008/0165140 A1 | 7/2008 | Christie et al. |
| 2008/0165141 A1 | 7/2008 | Christie |
| 2008/0165160 A1 | 7/2008 | Kocienda et al. |
| 2008/0165161 A1 | 7/2008 | Platzer et al. |
| 2008/0166049 A1 | 7/2008 | Wang et al. |
| 2008/0168384 A1 | 7/2008 | Platzer et al. |
| 2008/0168388 A1 | 7/2008 | Decker |
| 2008/0168395 A1 | 7/2008 | Ording et al. |
| 2008/0168402 A1 | 7/2008 | Blumenberg |
| 2008/0168405 A1 | 7/2008 | Tolmasky et al. |
| 2008/0168478 A1 | 7/2008 | Platzer et al. |
| 2008/0172633 A1 | 7/2008 | Jeon et al. |
| 2008/0195388 A1 | 8/2008 | Bower et al. |
| 2008/0207130 A1 | 8/2008 | Kunii |
| 2008/0218489 A1 | 9/2008 | Park et al. |
| 2008/0225014 A1 | 9/2008 | Kim |
| 2008/0231610 A1 | 9/2008 | Hotelling et al. |
| 2008/0316178 A1 | 12/2008 | Caliksan et al. |
| 2008/0316183 A1 | 12/2008 | Westerman et al. |
| 2009/0048000 A1 | 2/2009 | Ade-Hall |
| 2009/0049388 A1 | 2/2009 | Taib et al. |
| 2009/0051671 A1 | 2/2009 | Konstas |
| 2009/0058830 A1 | 3/2009 | Herz et al. |
| 2009/0063135 A1 | 3/2009 | Fux et al. |
| 2009/0064047 A1 | 3/2009 | Shim et al. |
| 2009/0070098 A1 | 3/2009 | Patryshev |
| 2009/0207140 A1 | 8/2009 | Hansson |
| 2009/0211891 A1 | 8/2009 | Lai et al. |
| 2009/0225037 A1 | 9/2009 | Williamson et al. |
| 2009/0225038 A1 | 9/2009 | Bolsinga et al. |
| 2009/0225039 A1 | 9/2009 | Williamson et al. |
| 2009/0228828 A1 | 9/2009 | Beatty et al. |
| 2009/0228901 A1 | 9/2009 | Beaver et al. |
| 2009/0231281 A1 | 9/2009 | Whytock et al. |
| 2009/0244020 A1 | 10/2009 | Sjolin |
| 2009/0251434 A1 | 10/2009 | Rimon et al. |
| 2009/0259969 A1 | 10/2009 | Pallakoff |
| 2009/0262087 A1 | 10/2009 | Kim |
| 2009/0273571 A1 | 11/2009 | Bowens |
| 2009/0282332 A1 | 11/2009 | Porat |
| 2009/0284479 A1 | 11/2009 | Dennis et al. |
| 2009/0300530 A1 | 12/2009 | Falchuk |
| 2009/0303187 A1 | 12/2009 | Pallakoff |
| 2009/0304281 A1 | 12/2009 | Yipu |
| 2009/0309847 A1 | 12/2009 | Russell et al. |
| 2009/0322687 A1 | 12/2009 | Duncan et al. |
| 2009/0322699 A1 | 12/2009 | Hansson |
| 2009/0322700 A1 | 12/2009 | D'Souza et al. |
| 2010/0013676 A1 | 1/2010 | Do et al. |
| 2010/0020025 A1 | 1/2010 | Lemort et al. |
| 2010/0020221 A1 | 1/2010 | Tupman et al. |

(56) References Cited

U.S. PATENT DOCUMENTS

| | | |
|---|---|---|
| 2010/0030612 A1 | 2/2010 | Kim et al. |
| 2010/0046850 A1 | 2/2010 | Ho et al. |
| 2010/0060666 A1 | 3/2010 | Fong |
| 2010/0085323 A1 | 4/2010 | Bogue |
| 2010/0107116 A1 | 4/2010 | Rieman et al. |
| 2010/0146458 A1 | 6/2010 | Wadekar |
| 2010/0149122 A1 | 6/2010 | Lin |
| 2010/0156804 A1 | 6/2010 | Young |
| 2010/0169841 A1 | 7/2010 | Singh |
| 2010/0177053 A2 | 7/2010 | Yasutake |
| 2010/0182248 A1 | 7/2010 | Chun |
| 2010/0235118 A1 | 9/2010 | Moore et al. |
| 2010/0245267 A1 | 9/2010 | Min et al. |
| 2010/0267449 A1 | 10/2010 | Gagner et al. |
| 2010/0281435 A1 | 11/2010 | Bangalore et al. |
| 2010/0283739 A1 | 11/2010 | Zhang et al. |
| 2010/0299594 A1 | 11/2010 | Zalewski et al. |
| 2010/0309147 A1 | 12/2010 | Fleizach et al. |
| 2010/0325575 A1 | 12/2010 | Platzer et al. |
| 2011/0037714 A1 | 2/2011 | Seo et al. |
| 2011/0047459 A1 | 2/2011 | Van Der Westhuizen |
| 2011/0069021 A1 | 3/2011 | Hill |
| 2011/0090257 A1 | 4/2011 | Ko et al. |
| 2011/0102336 A1 | 5/2011 | Seok et al. |
| 2011/0102464 A1 | 5/2011 | Godavari |
| 2011/0115745 A1 | 5/2011 | Cabrera Cordon et al. |
| 2011/0167391 A1 | 7/2011 | Momeyer et al. |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0181526 A1 | 7/2011 | Shaffer et al. |
| 2011/0242032 A1 | 10/2011 | Seo et al. |
| 2011/0252306 A1 | 10/2011 | Williamson et al. |
| 2011/0252307 A1 | 10/2011 | Williamson et al. |
| 2011/0252368 A1 | 10/2011 | Anzures et al. |
| 2011/0291951 A1 | 12/2011 | Tong |
| 2011/0295596 A1 | 12/2011 | Hung et al. |
| 2011/0304550 A1 | 12/2011 | Jolliff et al. |
| 2011/0304560 A1 | 12/2011 | Dale et al. |
| 2011/0307833 A1 | 12/2011 | Dale et al. |
| 2011/0310046 A1 | 12/2011 | Beaver et al. |
| 2011/0310047 A1 | 12/2011 | Moore et al. |
| 2011/0314429 A1 | 12/2011 | Blumenberg |
| 2011/0314430 A1 | 12/2011 | Blumenberg |
| 2011/0321125 A1 | 12/2011 | Kyohgoku et al. |
| 2012/0023443 A1 | 1/2012 | Blumenberg |
| 2012/0023460 A1 | 1/2012 | Blumenberg |
| 2012/0023461 A1 | 1/2012 | Blumenberg |
| 2012/0023509 A1 | 1/2012 | Blumenberg |
| 2012/0026104 A1 | 2/2012 | Ho et al. |
| 2012/0098768 A1 | 4/2012 | Bendewald et al. |
| 2012/0133579 A1 | 5/2012 | Prieur et al. |
| 2012/0169593 A1 | 7/2012 | Mak et al. |
| 2012/0221929 A1 | 8/2012 | Bolsinga et al. |
| 2012/0242584 A1 | 9/2012 | Tuli |
| 2012/0256849 A1 | 10/2012 | Crumly |
| 2012/0278725 A1 | 11/2012 | Gordon et al. |
| 2012/0299852 A1 | 11/2012 | Hsu et al. |
| 2013/0009986 A1 | 1/2013 | Shah et al. |
| 2013/0016039 A1 | 1/2013 | Moore et al. |
| 2013/0069899 A1 | 3/2013 | Beaver et al. |
| 2013/0120280 A1 | 5/2013 | Kukulski |
| 2013/0135217 A1 | 5/2013 | Honji et al. |
| 2013/0239046 A1 | 9/2013 | Platzer et al. |
| 2013/0244574 A1 | 9/2013 | Okuno et al. |
| 2013/0246861 A1 | 9/2013 | Colley et al. |
| 2013/0275888 A1 | 10/2013 | Williamson et al. |
| 2014/0033131 A1 | 1/2014 | Shaffer et al. |
| 2014/0145995 A1 | 5/2014 | Beaver et al. |
| 2014/0160052 A1 | 6/2014 | Moore et al. |
| 2014/0173419 A1 | 6/2014 | Williamson et al. |
| 2014/0181731 A1 | 6/2014 | Platzer et al. |
| 2014/0361982 A1 | 12/2014 | Shaffer |
| 2016/0018981 A1 | 1/2016 | Amerige et al. |
| 2016/0110230 A1 | 1/2016 | Moore et al. |
| 2016/0162180 A1 | 6/2016 | Moore et al. |
| 2016/0334990 A1 | 11/2016 | Beaver et al. |
| 2016/0342325 A1 | 11/2016 | Blumenberg |
| 2016/0370987 A1 | 12/2016 | Amerige et al. |
| 2017/0046063 A1 | 2/2017 | Shaffer et al. |
| 2018/0052522 A1 | 2/2018 | Shaffer |

FOREIGN PATENT DOCUMENTS

| | | |
|---|---|---|
| CN | 1326564 A | 12/2001 |
| CN | 1331815 A | 1/2002 |
| CN | 1422481 A | 6/2003 |
| CN | 1695105 A | 11/2005 |
| CN | 1704886 A | 12/2005 |
| CN | 1797308 A | 7/2006 |
| CN | 1841284 A | 10/2006 |
| CN | 1845046 A | 10/2006 |
| CN | 1860429 A | 11/2006 |
| CN | 1942853 A | 4/2007 |
| CN | 1967458 A | 5/2007 |
| CN | 1969254 A | 5/2007 |
| CN | 101040244 A | 9/2007 |
| CN | 101052939 A | 10/2007 |
| CN | 101089804 A | 12/2007 |
| CN | 101339453 A | 1/2009 |
| CN | 101356492 A | 1/2009 |
| CN | 101410781 A | 4/2009 |
| CN | 101526880 A | 9/2009 |
| CN | 101529368 A | 9/2009 |
| CN | 101727240 A | 6/2010 |
| DE | 202007013923 U1 | 12/2007 |
| DE | 202005021427 U1 | 2/2008 |
| EP | 0 538 705 A1 | 4/1993 |
| EP | 0 626 635 A2 | 11/1994 |
| EP | 0 635 779 A1 | 1/1995 |
| EP | 0 701 220 A1 | 3/1996 |
| EP | 0 712 825 A1 | 5/1996 |
| EP | 0 880 091 A2 | 11/1998 |
| EP | 1 517 228 A2 | 3/2005 |
| EP | 1 171 682 A2 | 11/2006 |
| EP | 1 860 539 A1 | 11/2007 |
| EP | 2031837 A2 | 3/2009 |
| EP | 2 141 576 A2 | 1/2010 |
| EP | 1 964 022 B1 | 3/2010 |
| EP | 2 184 673 A1 | 5/2010 |
| EP | 2 354 930 A1 | 8/2011 |
| EP | 2 390 766 A1 | 11/2011 |
| EP | 2 409 222 A2 | 1/2012 |
| EP | 2 472 384 A1 | 7/2012 |
| GB | 1517521 A | 7/1978 |
| GB | 2319591 A | 5/1998 |
| GB | 2351639 A | 1/2001 |
| GB | 2373778 A | 10/2002 |
| GB | 2404547 A | 7/2003 |
| JP | 02-140822 | 5/1990 |
| JP | 03-271976 | 12/1991 |
| JP | H05-019969 | 1/1993 |
| JP | H05-298002 | 11/1993 |
| JP | 06-149467 | 5/1994 |
| JP | 08-16314 | 1/1996 |
| JP | H09-114586 | 5/1997 |
| JP | H10-500509 | 1/1998 |
| JP | H11-085354 | 3/1999 |
| JP | 2000-163031 | 6/2000 |
| JP | 2000-163443 | 6/2000 |
| JP | 2000-222130 | 8/2000 |
| JP | 2000-322199 | 11/2000 |
| JP | 2001-027924 | 1/2001 |
| JP | 2001-167227 | 6/2001 |
| JP | 2001-290585 | 10/2001 |
| JP | 2003-296024 | 10/2003 |
| JP | 2003-330605 | 11/2003 |
| JP | 2005-056286 | 3/2005 |
| JP | 2005-082086 | 3/2005 |
| JP | 2005-108211 | 4/2005 |
| JP | 2005-165532 | 6/2005 |
| JP | 2005-242669 | 9/2005 |
| JP | 2005-275652 | 10/2005 |
| JP | 2005-322088 | 11/2005 |

(56) References Cited

FOREIGN PATENT DOCUMENTS

| | | |
|---|---|---|
| JP | 2006-085356 | 3/2006 |
| JP | 2006-085703 | 3/2006 |
| JP | 2006-102275 | 4/2006 |
| JP | 2006-314167 | 11/2006 |
| JP | 2006-350490 | 12/2006 |
| JP | 2007-523394 | 8/2007 |
| JP | 2008-503125 | 1/2008 |
| JP | 2008-027082 | 2/2008 |
| JP | 2008-508600 | 3/2008 |
| JP | 2008-508601 | 3/2008 |
| JP | 2008-146165 | 6/2008 |
| JP | 2008-203973 | 9/2008 |
| JP | 2008-312153 | 12/2008 |
| JP | 2009-110286 | 5/2009 |
| JP | 2009-169825 | 7/2009 |
| JP | 2009-525538 | 7/2009 |
| JP | 10-503124 A | 1/2010 |
| JP | 12-014299 | 1/2012 |
| JP | 2006-245128 | 9/2014 |
| KR | 2009-0057304 | 6/2009 |
| KR | 2009-0057421 | 6/2009 |
| WO | WO 00/38042 A1 | 6/2000 |
| WO | WO 01/29702 A2 | 4/2001 |
| WO | WO 01/77792 A2 | 10/2001 |
| WO | WO 02/01338 A1 | 1/2002 |
| WO | WO 02/08881 A | 1/2002 |
| WO | WO 02/13176 A2 | 2/2002 |
| WO | WO 02/21338 A2 | 3/2002 |
| WO | WO 03/060622 A2 | 7/2003 |
| WO | WO 03/081458 A1 | 10/2003 |
| WO | WO 04/001560 A1 | 12/2003 |
| WO | WO 2005/029460 A1 | 3/2005 |
| WO | WO 05/052773 A2 | 6/2005 |
| WO | WO 06/003590 A2 | 1/2006 |
| WO | WO 2006/003591 A2 | 1/2006 |
| WO | WO 06/020304 A2 | 2/2006 |
| WO | WO 06/020305 A2 | 2/2006 |
| WO | WO 2006/026183 A2 | 3/2006 |
| WO | WO 2006/045530 A2 | 5/2006 |
| WO | WO 2006/067711 A2 | 6/2006 |
| WO | WO 2006/094308 A2 | 9/2006 |
| WO | WO 2006/124248 A2 | 11/2006 |
| WO | WO 2006/128248 A1 | 12/2006 |
| WO | WO 2007/037806 A1 | 4/2007 |
| WO | WO 2007/067858 A1 | 6/2007 |
| WO | WO 2007/079425 A2 | 7/2007 |
| WO | WO 2007/089766 A2 | 8/2007 |
| WO | WO 2008/020446 A1 | 2/2008 |
| WO | WO 2008/030779 A2 | 3/2008 |
| WO | WO 2008/030879 A2 | 3/2008 |
| WO | WO 2008/030880 A1 | 3/2008 |
| WO | WO 2008/085846 A2 | 7/2008 |
| WO | WO 2008/085848 A1 | 7/2008 |
| WO | WO 2008/085855 A1 | 7/2008 |
| WO | WO 2008/085871 A1 | 7/2008 |
| WO | WO 2008/085877 A1 | 7/2008 |
| WO | WO 2008/148021 A2 | 12/2008 |
| WO | WO 2009/018314 A2 | 2/2009 |
| WO | WO 2009/111189 A1 | 9/2009 |
| WO | WO 2009/111458 A1 | 9/2009 |
| WO | WO 2009/111460 A1 | 9/2009 |
| WO | WO 2009/111469 A1 | 9/2009 |
| WO | WO 2010/041155 A1 | 4/2010 |
| WO | WO 2010/107669 A2 | 9/2010 |
| WO | WO 2010/144201 A2 | 12/2010 |

OTHER PUBLICATIONS

Notice of Allowance, dated May 24, 2012, received in U.S. Appl. No. 12/566,660, 9 pages.
Notice of Allowance, dated Jul. 26, 2012, received in U.S. Appl. No. 12/566,660, 5 pages.
Office Action, dated Oct. 17, 2012, received in Australian Patent Application No. 2010226120, which corresponds with U.S. Appl. No. 12/566,660, 3 pages.
Notice of Allowance, dated Nov. 2, 2012, received in Canadian Patent Application No. 2,755,443, which corresponds with U.S. Appl. No. 12/566,660, 1 page.
Notice of Allowance, dated Apr. 10, 2014, received in Canadian Patent Application No. 2,817,648, which corresponds with U.S. Appl. No. 12/566,660, 1 page.
Office Action, dated Oct. 9, 2013, received in Canadian Patent Application No. 2,817,890, which corresponds with U.S. Appl. No. 12/566,660, 3 pages.
Office Action, dated Apr. 22, 2014, received in Canadian Patent Application No. 2,817,890, which corresponds with U.S. Appl. No. 12/566,660, 3 pages.
Letters Patent, dated Dec. 29, 2015, received in Canadian Patent Application No. 2,817,890, which corresponds with U.S. Appl. No. 12/566,660, 2 pages.
Office Action, dated Nov. 28, 2016, received in Canadian Patent Application No. 2,909,730, which corresponds with U.S. Appl. No. 12/566,660, 4 pages.
Office Action, dated Oct. 31, 2013, received in Chinese Patent Application No. 201080020598.0, which corresponds with U.S. Appl. No. 12/566,660, 4 pages.
Decision to Grant, dated Apr. 24, 2014, received in Chinese Patent Application No. 201080020598.0, which corresponds with U.S. Appl. No. 12/566,660, 1 page.
Office Action, dated Sep. 26, 2016, received in Chinese Patent Application No. 2016092101783870, which corresponds with U.S. Appl. No. 12/566,660, 2 pages.
Notice of Allowance, dated Mar. 21, 2017, received in Chinese Patent Application No. 201410299526.4, which corresponds with U.S. Appl. No. 12/566,660, 3 pages.
Notice of Allowance, dated Mar. 10, 2017, received in Chinese Patent Application No. 201410299324.X, which corresponds with U.S. Appl. No. 12/566,660, 3 pages.
Office Action, dated Jun. 19, 2013, received in European Patent Application No. 10712825.8, which corresponds with U.S. Appl. No. 12/566,660, 5 pages.
Office Action, dated Jul. 1, 2015, received in European Patent Application No. 10712825.8, which corresponds with U.S. Appl. No. 12/566,660, 6 pages.
Office Action, dated Mar. 20, 2014, received in European Patent Application No. 11184186.2, which corresponds with U.S. Appl. No. 12/566,660, 5 pages.
Office Action, dated Jun. 3, 2013, received in Japanese Patent Application No. 2012-500844, which corresponds with U.S. Appl. No. 12/566,660, 5 pages.
Office Action, dated Feb. 24, 2014, received in Japanese Patent Application No. 2012-500844, which corresponds with U.S. Appl. No. 12/566,660, 2 pages.
Notice of Allowance, dated Aug. 1, 2014, received in Japanese Patent Application No. 2012-500844, which corresponds with U.S. Appl. No. 12/566,660, 2 pages.
Office Action, dated Sep. 7, 2015, received in Japanese Patent Application No. 2014-129689, which corresponds with U.S. Appl. No. 12/566,660, 3 pages.
Certificate of Patent, dated Jan. 7, 2016, received in Japanese Patent Application No. 2014-129689, which corresponds with U.S. Appl. No. 12/566,660, 3 pages.
Certificate of Patent, dated Feb. 5, 2016, received in Japanese Patent Application No. 2014-129689, which corresponds with U.S. Appl. No. 12/566,660, 1 page.
Office Action, dated Nov. 18, 2016, received in Japanese Patent Application No. 2016-017396, which corresponds with U.S. Appl. No. 12/566,660, 5 pages.
Notice of Allowance, dated May 29, 2013, received in Korean Patent Application No. 2011-7024288, which corresponds with U.S. Appl. No. 12/566,660, 2 pages.
Office Action, dated Oct. 4, 2013, received in U.S. Appl. No. 12/789,684, 19 pages.
Final Office Action, dated Mar. 7, 2014, received in U.S. Appl. No. 12/789,684, 23 pages.

(56) References Cited

OTHER PUBLICATIONS

Office Action, dated Jul. 18, 2014, received in U.S. Appl. No. 12/789,684, 29 pages.
Office Action, dated Jan. 28, 2015, received in U.S. Appl. No. 12/789,684, 29 pages.
Notice of Allowance, dated Aug. 14, 2015, received in U.S. Appl. No. 12/789,684, 15 pages.
Office Action, dated Mar. 4, 2013, received in U.S. Appl. No. 12/789,695, 13 pages.
Office Action, dated Oct. 24, 2013, received in U.S. Appl. No. 12/789,695, 14 pages.
Final Office Action, dated May 7, 2014, received in U.S. Appl. No. 12/789,695, 17 pages.
Office Action, dated Jul. 1, 2015, received in U.S. Appl. No. 12/789,695, 15 pages.
Final Office Action, dated Feb. 22, 2016, received in U.S. Appl. No. 12/789,695, 17 pages.
Notice of Allowance, dated Feb. 23, 2017, received in U.S. Appl. No. 12/789,695, 8 pages.
Notice of Acceptance, dated May 1, 2014, received in Australian Patent Application No. 2011209720, which corresponds with U.S. Appl. No. 12/789,695, 3 pages.
Office Action, dated Jun. 28, 2013, received in Australian Patent Application No. 2011209720, which corresponds with U.S. Appl. No. 12/789,695, 4 pages.
Office Action, dated Aug. 27, 2015, received in Australian Patent Application No. 2014213525, which corresponds with U.S. Appl. No. 12/789,695, 6 pages.
Notice of Allowance, dated Apr. 14, 2016, received in Australian Patent Application No. 2014213525, which corresponds with U.S. Appl. No. 12/789,695, 1 page.
Certificate of Grant, dated Aug. 11, 2016, received in Australian Patent Application No. 2014213525, which corresponds with U.S. Appl. No. 12/789,695, 1 page.
Office Action, dated Oct. 22, 2012, received in Chinese Patent Application No. 201110063183.8, which corresponds with U.S. Appl. No. 12/789,695, 2 pages.
Office Action, dated Aug. 26, 2013, received in Chinese Patent Application No. 201110063183.8, which corresponds with U.S. Appl. No. 12/789,695, 2 pages.
Decision to Grant, dated Feb. 24, 2014, received in Chinese Application No. 201110063183.8, which corresponds with U.S. Appl. No. 12/789,695, 1 page.
Office Action, dated Dec. 3, 2015, received in Chinese Patent Application No. 201310557439.X, which corresponds with U.S. Appl. No. 12/789,695, 2 pages.
Notice of Allowance, dated Jul. 27, 2016, received in Chinese Patent Application No. 201310557439.X, which corresponds with U.S. Appl. No. 12/789,695, 3 pages.
Patent Certificate, dated Aug. 31, 2016, received in Chinese Patent Application No. 201310557439.X, which corresponds with U.S. Appl. No. 12/789,695, 2 pages.
Office Action, dated Feb. 2, 2016, received in Chinese Patent Application No. 2013105574402, which corresponds with U.S. Appl. No. 12/789,695, 5 pages.
Office Action, dated Nov. 9, 2016, received in Chinese Patent Application No. 2013105574402, which corresponds with U.S. Appl. No. 12/789,695, 3 pages.
Office Action, dated Aug. 24, 2016, received in Chinese Patent Application No. 2016082000182820, which corresponds with U.S. Appl. No. 12/789,695, 2 pages.
Office Action, dated Jul. 26, 2013, received in European Patent Application No. 11152015.1, which corresponds with U.S. Appl. No. 12/789,695, 6 pages.
Office Action, dated Mar. 29, received in European Patent Application No. 11152015.1, which corresponds with U.S. Appl. No. 12/789,695, 11 pages.
Office Action, dated Jul. 17, 2015, received in Japanese Patent Application No. 2014-044208, which corresponds with U.S. Appl. No. 12/789,695, 5 pages.
Notice of Allowance, dated Apr. 15, 2016, received in Japanese Patent Application No. 2014-044208, which corresponds with U.S. Appl. No. 12/789,695, 3 pages.
Patent Certificate, dated May 20, 2016, received in Japanese Patent Application No. 2014-044208, which corresponds with U.S. Appl. No. 12/789,695, 2 page.
Office Action, dated Apr. 30, 2014, received in Korean Patent Application No. 2012-7022239, which corresponds with U.S. Appl. No. 12/789,695, 2 pages.
Notice of Allowance, dated Mar. 30, 2015, received in Korean Patent Application No. 2012-7022239, which corresponds with U.S. Appl. No. 12/789,695, 2 pages. (KR version only).
Notice of Allowance, dated May 23, 2016, received in Korean Patent Application No. 10-2014-7030745, which corresponds with U.S. Appl. No. 12/789,695, 3 pages.
Letters Patent, dated Jul. 29, 2016, received in Korean Patent Application No. 10-2014-7030745, which corresponds with U.S. Appl. No. 12/789,695, 2 pages.
Notice of Allowance, dated Nov. 9, 2016, received in Korean Patent Application No. 10-2016-7020780, which corresponds with U.S. Appl. No. 12/789,695, 4 pages.
Patent, dated Jan. 5, 2017, received in Korean Patent Application No. 10-2016-7020780, which corresponds with U.S. Appl. No. 12/789,695, 3 pages.
Notice of Allowance, dated May 15, 2013, received in U.S. Appl. No. 12/892,848, 10 pages.
Office Action, dated Aug. 14, 2013, received in Australian Patent Application No. 2011268047, which corresponds with U.S. Appl. No. 12/892,848, 2 pages.
Notice of Allowance, dated Mar. 18, 2016, received in Australian Patent Application No. 2014200702, which corresponds with U.S. Appl. No. 12/892,848, 2 pages.
Certificate of Grant, dated Sep. 22, 2016, received in Australian Patent Application No. 2014200702, which corresponds with U.S. Appl. No. 12/892,848, 1 page.
Office Action, dated Dec. 3, 2014, received in Chinese Patent Application No. 201180022994.1, which corresponds with U.S. Appl. No. 12/892,848, 2 pages.
Office Action, dated Nov. 24, 2015, received in Chinese Patent Application No. 201180022994.1, which corresponds with U.S. Appl. No. 12/892,848, 2 pages.
Notice of Allowance, dated Apr. 6, 2016, received in Chinese Patent Application No. 201180022994.1, which corresponds with U.S. Appl. No. 12/892,848, 2 pages.
Patent Certificate, dated May 18, 2016, received in Chinese Patent Application No. 201180022994.1, which corresponds with U.S. Appl. No. 12/892,848, 1 page.
Office Action, dated Aug. 22, 2013, received in European Patent Application No. 11727371.4, which corresponds with U.S. Appl. No. 12/892,848, 6 pages.
Office Action, dated Aug. 26, 2015, received in European Patent Application No. 11727371.4, which corresponds with U.S. Appl. No. 12/892,848, 9 pages.
Notice of Allowance, dated Aug. 22, 2014, received in Japanese Patent Application No. 2013-515382, which corresponds with U.S. Appl. No. 12/892,848, 3 pages.
Office Action, dated Nov. 13, 2015, received in Japanese Patent Application No. 2014-191701, which corresponds with U.S. Appl. No. 12/892,848, 3 pages.
Notice of Allowance, dated Jun. 27, 2016, received in Japanese Patent Application No. 2014-191701, which corresponds with U.S. Appl. No. 12/892,848, 3 pages.
Certificate of Patent, dated Jul. 29, 2016, received in Japanese Patent Application No. 2014-191701, which corresponds with U.S. Appl. No. 12/892,848, 2 pages.
Office Action, dated Oct. 9, 2012, received in U.S. Appl. No. 12/892,851, 11 pages.
Final Office Action, dated Jul. 19, 2013, received in U.S. Appl. No. 12/892,851, 12 pages.
Office Action, dated May 22, 2014, received in U.S. Appl. No. 12/892,851, 11 pages.
Office Action, dated Nov. 4, 2016, received in U.S. Appl. No. 12/892,851, 13 pages.

(56) References Cited

OTHER PUBLICATIONS

Notice of Allowance, dated Jun. 27, 2013, received in U.S. Appl. No. 13/077,925, 10 pages.
Office Action, dated Dec. 10, 2014, received in Australian Patent Application No. 2011349513, which corresponds with U.S. Appl. No. 13/077,925, 3 pages.
Certificate of Grant, dated Jul. 16, 2015, received in Australian Patent Application No. 2011349513, which corresponds with U.S. Appl. No. 13/077,925, 2 pages.
Office Action, dated Mar. 15, 2016, received in Australian Patent Application No. 2015203638, which corresponds with U.S. Appl. No. 13/077,925, 3 pages.
Office Action, dated Apr. 30, 2014, received in Chinese Patent Application No. 201110463262.8, which corresponds with U.S. Appl. No. 13/077,925, 2 pages.
Office Action, dated Sep. 23, 2015, received in Chinese Patent Application No. 201110463262.8, which corresponds with U.S. Appl. No. 13/077,925, 2 pages.
NOA/Grant, dated Apr. 1, 2016, received in Chinese Patent Application No. 20110463262.8, which corresponds with U.S. Appl. No. 13/077,925, 2 pages.
Letters Patent, dated May 4, 2016, received in Chinese Patent Application No. 20110463262.8, which corresponds with U.S. Appl. No. 13/077,925, 3 pages.
Office Action, dated Oct. 19, 2012, received in Chinese Patent Application No. 201120580018.5, which corresponds with U.S. Appl. No. 13/077,925, 2 pages.
Office Action, dated Apr. 22, 2013, received in Chinese Patent Application No. 201120580018.5, which corresponds with U.S. Appl. No. 13/077,925, 2 pages.
Notification of Grant, dated Jul. 26, 2013, received in Chinese Patent Application No. 201120580018.5, which corresponds with U.S. Appl. No. 13/077,925, 1 page.
Office Action, dated Jul. 1, 2014, received in European Patent Application No. 11808779.0, which corresponds with U.S. Appl. No. 13/077,925, 5 pages.
Notice of Allowance, dated Jun. 27, 2016, received in Japanese Patent Application No. 2015-077922, which corresponds with U.S. Appl. No. 13/077,925, 5 pages.
Certificate of Patent, dated Aug. 5, 2016, received in Japanese Patent Application No. 2015-077922, which corresponds with U.S. Appl. No. 13/077,925, 2 pages.
Office Action, dated Jun. 26, 2014, received in Korean Patent Application No. 2013-7019463, which corresponds with U.S. Appl. No. 13/077,925, 2 pages.
Office Action, dated Oct. 20, 2015, received in Korean Patent Application No. 2014-7036632, which corresponds with U.S. Appl. No. 13/077,925, 2 pages.
Notice of Allowance, dated Apr. 29, 2016, received in Korean Patent Application No. 2014-7036632, which corresponds with U.S. Appl. No. 13/077,925, 3 pages.
Letters Patent, dated Jul. 29, 2016, received in Korean Patent Application No. 2014-7036632, which corresponds with U.S. Appl. No. 13/077,925, 3 pages.
Office Action, dated Aug. 23, 2016, received in Korean Patent Application No. 2016-7020964, which corresponds with U.S. Appl. No. 13/077,925, 2 pages.
Office Action, dated Apr. 8, 2014, received in Taiwanese Patent Application No. 100147539, which corresponds with U.S. Appl. No. 13/077,925, 4 pages.
Notice of Allowance, dated Oct. 5, 2015, received in Taiwanese Patent Application No. 103144867, which corresponds with U.S. Appl. No. 13/077,925, 3 pages.
Certificate of Grant, dated Feb. 1, 2016, received in Taiwanese Patent Application No. 103144867, which corresponds with U.S. Appl. No. 13/077,925, 2 pages.
Office Action, dated Feb. 16, 2011, received in U.S. Appl. No. 12/042,318, 25 pages.
Final Office Action, dated Sep. 15, 2011, received in U.S. Appl. No. 12/042,318, 39 pages.
Notice of Allowance, dated Dec. 16, 2013, received in U.S. Appl. No. 12/042,318, 30 pages.
Office Action, dated Feb. 25, 2011, received in Australian Patent Application 2009200493, which corresponds with U.S. Appl. No. 12/042,318, 3 pages.
Office Action, dated Aug. 9, 2011, received in Australian Patent Application No. 2009200493, which corresponds with U.S. Appl. No. 12/042,318, 2 pages.
Office Action, dated Feb. 22, 2012, received in Australian Patent Application No. 2011205170, which corresponds with U.S. Appl. No. 12/042,318, 3 pages.
Notice of Acceptance, dated Jul. 3, 2013, received in Australian Patent Application No. 2011205170, which corresponds with U.S. Appl. No. 12/042,318, 2 pages.
Office Action, dated Dec. 13, 2011, received in Australian Patent Application No. 2011101154, which corresponds with U.S. Appl. No. 12/042,318, 4 pages.
Letters Patent, dated May 7, 2012, received in Australian Patent Application No. 2011101154, which corresponds with U.S. Appl. No. 12/042,318, 1 page.
Office Action, dated Dec. 13, 2011, received in Australian Patent Application No. 2011101157, which corresponds with U.S. Appl. No. 12/042,318, 4 pages.
Letters Patent, dated May 8, 2012, received in Australian Patent Application No. 2011101157, which corresponds with U.S. Appl. No. 12/042,318, 1 page.
Office Action, dated Dec. 13, 2011, received in Australian Patent Application No. 2011101156, which corresponds with U.S. Appl. No. 12/042,318, 3 pages.
Letters Patent, dated May 8, 2012, received in Australian Patent Application No. 2011101156, which corresponds with U.S. Appl. No. 12/042,318, 1 page.
Office Action, dated Dec. 13, 2011, received in Australian Patent Application No. 2011101155, which corresponds with U.S. Appl. No. 12/042,318, 3 pages.
Letters Patent, May 8, 2012, received in Australian Patent Application No. 2011101155, which corresponds with U.S. Appl. No. 12/042,318, 1 page.
Office Action, dated Sep. 3, 2012, received in Australian Patent Application No. 2011265335, which corresponds with U.S. Appl. No. 12/042,318, 2 pages.
Notice of Acceptance, dated Nov. 20, 2012, received in Australian Patent Application No. 2011265335, which corresponds with U.S. Appl. No. 12/042,318, 3 pages.
Notice of Acceptance, dated Jul. 14, 2016, received in Australian Patent Application No. 2013242854, which corresponds with U.S. Appl. No. 12/042,318, 2 pages.
Certificate of Grant, dated Nov. 24, 2016, received in Australian Patent Application No. 2013242854, which corresponds with U.S. Appl. No. 12/042,318, 1 page.
Office Action, dated Feb. 17, 2017, received in Australian Patent Application No. 2016206268, which corresponds with U.S. Appl. No. 12/042,318, 2 pages.
Office Action, dated Jan. 18, 2012, received in Canadian Patent Application No. 2,653,363, which corresponds with U.S. Appl. No. 12/042,318, 2 pages.
Office Action, dated Sep. 3, 2013, received in Canadian Patent Application No. 2,653,363, which corresponds with U.S. Appl. No. 12/042,318, 3 pages.
Notice of Allowance, dated Apr. 29, 2014, received in Canadian Patent Application No. 2653363, which corresponds with U.S. Appl. No. 12/042,318, 1 page.
Office Action, dated Jan. 7, 2016, received in Canadian Patent Application No. 2653363, which corresponds with U.S. Appl. No. 12/042,318, 4 pages.
Office Action, dated Dec. 28, 2016, received in Canadian Patent Application No. 2653363, which corresponds with U.S. Appl. No. 12/042,318, 1 page.
Office Action, dated Mar. 15, 2017, received in Canadian Patent Application No. 2,931,604, which corresponds with U.S. Appl. No. 12/042,318, 3 pages.

(56) References Cited

OTHER PUBLICATIONS

Office Action, dated Aug. 6, 2010, received in Chinese Patent Application No. 200910118596.4, which corresponds with U.S. Appl. No. 12/042,318, 2 pages.
Decision to Grant, dated Mar. 22, 2011, received in Chinese Patent Application No. 200910118596.4, 3 pages.
Office Action, dated Aug. 5, 2013, received in Chinese Patent Application No. 201110148738.9, which corresponds with U.S. Appl. No. 12/042,318, 6 pages.
Office Action, dated Jun. 5, 2014, received in Chinese Patent Application No. 201110148738.9, which corresponds with U.S. Appl. No. 12/042,318, 2 pages.
Office Action, dated Feb. 8, 2014, received in Chinese Patent Application No. 201110148738.9, which corresponds with U.S. Appl. No. 12/042,318, 2 pages.
Office Action, dated Jan. 21, 2013, received in Chinese Patent Application No. 201110148738.9, which corresponds with U.S. Appl. No. 12/042,318, 2 pages.
Office Action, dated Jun. 22, 2010, received in Danish Patent Application No. 102009011687.7, which corresponds with U.S. Appl. No. 12/042,318, 5 pages.
Office Action, dated Feb. 12, 2010, received in European Patent Application No. 09154313.2, which corresponds with U.S. Appl. No. 12/042,318, 1 page.
Decision revoking the European Patent, dated Apr. 2, 2014, received in European Patent Application No. 09154313.2, which corresponds with U.S. Appl. No. 12/042,318, 2 pages.
Summons to Oral Proceedings, dated May 15, 2013, received in European Patent Application No. 09154313.2, which corresponds with U.S. Appl. No. 12/042,318, 30 pages.
New Summons to Oral Proceedings, dated Jul. 18, 2013, received in European Patent Application No. 09154313.2, which corresponds with U.S. Appl. No. 12/042,318, 3 pages.
Decision to Grant, dated Jul. 26, 2012, received in European Patent Application No. 11150786.9, which corresponds with U.S. Appl. No. 12/042,318, 1 page.
Office Action, dated May 9, 2014, received in European Patent Application No. 11150788.5, which corresponds with U.S. Appl. No. 12/042,318, 6 pages.
Decision to Grant, dated Sep. 17, 2015, received in European Application No. 11150788.5, which corresponds with U.S. Appl. No. 12/042,318, 1 page.
Patent, dated Oct. 14, 2015, received in European Patent Application No. 11150788.5, which corresponds with U.S. Appl. No. 12/042,318, 1 page.
Office Action, dated May 14, 2014, received in European Patent Application No. 11184167.2, which corresponds with U.S. Appl. No. 12/042,318, 6 pages.
Office Action, dated Apr. 15, 2015, received in European Patent Application No. 11184167.2, which corresponds with U.S. Appl. No. 12/042,318, 3 pages.
Office Action, dated Nov. 25, 2015, received in European Patent Application No. 11184167.2, which corresponds with U.S. Appl. No. 12/042,318, 7 pages.
Office Action, dated Feb. 16, 2016, received in European Patent Application No. 11184167.2, which corresponds with U.S. Appl. No. 12/042,318, 6 pages.
Intention to Grant, dated Sep. 28, 2016, received in European Patent Application No. 11184167.2, which corresponds with U.S. Appl. No. 12/042,318, 5 pages.
Decision to Grant, dated Mar. 23, 2017, received in European Patent Application No. 11184167.2, which corresponds with U.S. Appl. No. 12/042,318, 1 page.
Office Action, dated May 14, 2014, received in Patent Application No. 11184169.8, which corresponds with U.S. Appl. No. 12/042,318, 6 pages.
Office Action, dated Nov. 25, 2015, received in European Patent Application No. 11184169.8, which corresponds with U.S. Appl. No. 12/042,318, 8 pages.
Office Action, dated Feb. 16, 2016, received in European Patent Application No. 11184169.8, which corresponds with U.S. Appl. No. 12/042,318, 6 pages.
Intention to Grant, dated Sep. 29, 2016, received in European Patent Application No. 11184169.8, which corresponds with U.S. Appl. No. 12/042,318, 5 pages.
Decision to Grant, dated Sep. 29, 2016, received in European Patent Application No. 11184169.8, which corresponds with U.S. Appl. No. 12/042,318, 1 page.
Office Action, dated May 16, 2014, received in European Patent Application No. 11184170.6, which corresponds with U.S. Appl. No. 12/042,318, 5 pages.
Office Action, dated Apr. 16, 2015, received in European Patent Application No. 11184170.6, which corresponds with U.S. Appl. No. 12/042,318, 2 pages.
Office Action, dated Nov. 30, 2015, received in European Patent Application No. 11184170.6, which corresponds with U.S. Appl. No. 12/042,318, 4 pages.
Intention to Grant, dated Jul. 8, 2016, received in European Patent Application No. 11184170.6, which corresponds with U.S. Appl. No. 12/042,318, 7 pages.
Office Action, dated May 16, 2014, received in European Patent Application No. 11184172.2, which corresponds with U.S. Appl. No. 12/042,318, 5 pages.
Office Action, dated Apr. 17, 2015, received in European Patent Application No. 11184172.2, which corresponds with U.S. Appl. No. 12/042,318, 6 pages.
Office Action, dated Nov. 30, 2015, received in European Patent Application No. 11184172.2, which corresponds with U.S. Appl. No. 12/042,318, 4 pages.
Intention to Grant, dated Jul. 8, 2016, received in European Patent Application No. 11184172.2, which corresponds with U.S. Appl. No. 12/042,318, 5 pages.
Office Action, dated Oct. 22, 2014, received in European Patent Application No. 12156394.4, which corresponds with U.S. Appl. No. 12/042,318, 6 pages.
Office Action, dated Nov. 25, 2015, received in European Patent Application No. 12156394.4, which corresponds with U.S. Appl. No. 12/042,318, 8 pages.
Decision to Grant, dated Jul. 28, 2016, received in European Patent Application No. 12156394.4, which corresponds with U.S. Appl. No. 12/042,318, 1 page.
Office Action, dated Oct. 22, 2014, received in European Patent Application No. 12156395.1, which corresponds with U.S. Appl. No. 12/042,318, 6 pages.
Office Action, dated Nov. 25, 2015, received in European Application No. 12156395.1, which corresponds with U.S. Appl. No. 12/042,318, 9 pages.
Intention to Grant, dated Aug. 9, 2016, received in European Application No. 12156395.1, which corresponds with U.S. Appl. No. 12/042,318, 3 pages.
Certificate of Grant, dated Nov. 30, 2012, received in Honk Kong Patent Application No. 11110416.2, which corresponds with U.S. Appl. No. 12/042,318, 1 page.
Certificate of Grant, dated Jul. 17, 2015, received in Hong Kong Patent Application No. 12105027.2, which corresponds with U.S. Appl. No. 12/042,318, 2 pages.
Office Action, dated Jul. 20, 2015, received in Israel Patent Application No. 197386, which corresponds with U.S. Appl. No. 12/042,318, 3 pages.
Notice of Allowance, dated Nov. 23, 2015, received in Israel Patent Application No. 197386, which corresponds with U.S. Appl. No. 12/042,318, 2 pages.
Patent, dated May 30, 2016, received in Israel Patent Application No. 197386, which corresponds with U.S. Appl. No. 12/042,318, 2 pages.
Office Action, dated Aug. 26, 2011, received in Japanese Patent Application No. 2009-080377, which corresponds with U.S. Appl. No. 12/042,318, 2 pages.
Decision to Grant, dated Jul. 27, 2012, received in Japanese Patent Application No. 2009-080377, which corresponds with U.S. Appl. No. 12/042,318, 4 pages.

(56) References Cited

OTHER PUBLICATIONS

Decision to Grant, dated Nov. 1, 2013, received in Japanese Patent Application No. 2012-186775, which corresponds with U.S. Appl. No. 12/042,318, 3 pages.
Office Action, dated Apr. 4, 2016, received in Japanese Patent Application No. 2015085361, which corresponds with U.S. Appl. No. 12/042,318, 3 pages.
Office Action, dated Jan. 18, 2011, received in U.S. Appl. No. 12/042,067, 13 pages.
Final Office Action, dated Jul. 28, 2011, received in U.S. Appl. No. 12/042,067, 12 pages.
Office Action, dated Mar. 14, 2013, received in U.S. Appl. No. 12/042,067, 15 pages.
Notice of Allowance, dated Dec. 6, 2013, received in U.S. Appl. No. 12/042,067, 9 pages.
Notice of Allowance, dated Sep. 27, 2013, received in U.S. Appl. No. 12/042,067, 10 pages.
Office Action, dated Jun. 13, 2012, received in Chinese Patent Application No. 200980000014.0, which corresponds with U.S. Appl. No. 12/042,067, 2 pages.
Office Action, dated Oct. 19, 2011, received in Chinese Patent Application No. 200980000014.0, which corresponds with U.S. Appl. No. 12/042,067, 2 pages.
Decision to Grant, dated Nov. 27, 2012, received in Chinese Patent Application No. 200980000014.0, which corresponds with U.S. Appl. No. 12/042,067, 1 page.
Office Action, dated May 4, 2015, received in Chinese Patent Application No. 20130053142.X, which corresponds with U.S. Appl. No. 12/042,067, 6 pages.
Office Action, dated Mar. 21, 2016, received in Chinese Patent Application No. 20130053142.X, which corresponds with U.S. Appl. No. 12/042,067, 7 pages.
Office Action, dated Oct. 10, 2016, received in Chinese Patent Application No. 201310053142.X, which corresponds with U.S. Appl. No. 12/042,067, 8 pages.
Decision to Grant, dated Apr. 14, 2016, received in European Patent Application No. 09700006.1, which corresponds with U.S. Appl. No. 12/042,067, 1 page.
Office Action, dated Oct. 19, 2010, received in German Patent Application No. 112009000001.0, which corresponds with U.S. Appl. No. 12/042,067, 5 pages.
Office Action, dated Sep. 26, 2012, received in German Patent Application No. 112009000001.0, which corresponds with U.S. Appl. No. 12/042,067, 5 pages.
Office Action, dated Oct. 15, 2010, received in European Patent Application No. 09700006.1, which corresponds with U.S. Appl. No. 12/042,067, 4 pages.
Decision to Refuse, dated Jul. 15, 2013, received in European Patent Application No. 09700006.1, which corresponds with U.S. Appl. No. 12/042,067, 12 pages.
Summons to Oral Proceedings, dated Mar. 7, 2013, received in European Patent Application No. 09700006.1, which corresponds with U.S. Appl. No. 12/042,067, 5 pages.
Summons to Oral Proceedings, dated Mar. 10, 2015, received in European Patent Application No. 09700006.1, which corresponds with U.S. Appl. No. 12/042,067, 9 pages.
Decision to Grant, dated Apr. 12, 2015, received in European Patent Application No. 09700006.1, which corresponds with U.S. Appl. No. 12/042,067, 5 pages.
Office Action, dated Oct. 30, 2013, received in European Patent Application No. 12188748.3, which corresponds with U.S. Appl. No. 12/042,067, 5 pages.
Decision to refuse, dated Dec. 12, 2014, received in European Patent Application No. 12188748.3, which corresponds with U.S. Appl. No. 12/042,067, 12 pages.
Summons to Attend Oral Proceedings, dated Apr. 22, 2014, received in European Patent Application No. 12188748.3, which corresponds with U.S. Appl. No. 12/042,067, 3 pages.

Office Action, dated Oct. 24, 2011, received in Japanese Patent Application No. 2010-502356, which corresponds with U.S. Appl. No. 12/042,067, 2 pages.
Office Action, dated Jan. 6, 2014, received in Japanese Patent Application No. 2012-224838, which corresponds with U.S. Appl. No. 12/042,067, 1 page.
Office Action, dated Jan. 4, 2011, received in U.S. Appl. No. 12/042,299, 9 pages.
Final Office Action, dated Jul. 8, 2011, received in U.S. Appl. No. 12/042,299, 8 pages.
Office Action, dated May 3, 2012, received in U.S. Appl. No. 12/042,299, 9 pages.
Notice of Allowance, dated Dec. 12, 2012, received in U.S. Appl. No. 12/042,299, 8 pages.
Office Action, dated Oct. 26, 2011, received in Chinese Patent Application No. 200980000013.6, which corresponds with U.S. Appl. No. 12/042,299, 2 pages.
Office Action, dated Dec. 5, 2012, received in Chinese Patent Application No. 200980000013.6, which corresponds with U.S. Appl. No. 12/042,299, 2 pages.
Office Action, dated Jun. 6, 2012, received in Chinese Patent Application No. 200980000013.6, which corresponds with U.S. Appl. No. 12/042,299, 2 pages.
Office Action, dated Jul. 3, 2013, received in Chinese Patent Application No. 200980000013.6, which corresponds with U.S. Appl. No. 12/042,299, 6 pages.
Office Action, dated Apr. 28, 2016, received in Chinese Patent Application No. 2016042501712900, which corresponds with U.S. Appl. No. 12/042,299, 2 pages.
Office Action, dated Jun. 1, 2016, received in Chinese Patent Application No. 2014100285627, which corresponds with U.S. Appl. No. 12/042,299, 3 pages.
Office Action, dated Aug. 10, 2010, received in German Patent Application No. 112009000003.7, which corresponds with U.S. Appl. No. 12/042,299, 3 pages.
Office Action, dated Sep. 26, 2012, received in German Patent application No. 112009000003.7, which corresponds with U.S. Appl. No. 12/042,299, 5 pages.
Office Action, dated Mar. 9, 2012, received in European Patent Application No. 09700007.9, which corresponds with U.S. Appl. No. 12/042,299, 7 pages.
Office Action, dated Nov. 26, 2010, received in European Patent Application No. 09700007.9, which corresponds with U.S. Appl. No. 12/042,299, 5 pages.
Office Action, dated Aug. 28, 2014, received in European Patent Application No. 09700007.9, which corresponds with U.S. Appl. No. 12/042,299, 8 pages.
Summons to oral proceedings, dated Oct. 30, 2013, received in European Patent Application No. 09700007.9, which corresponds with U.S. Appl. No. 12/042,299, 5 pages.
Office Action, dated Sep. 12, 2012, received in European Patent Application No. 11184226.6, which corresponds with U.S. Appl. No. 12/042,299, 5 pages.
Office Action, dated Jul. 25, 2016, received in European Patent Application No. 11184226.6, which corresponds with U.S. Appl. No. 12/042,299, 9 pages.
Office Action, dated Sep. 12, 2012, received in European Patent Application No. 11184224.1, which corresponds with U.S. Appl. No. 12/042,299, 4 pages.
Decision to Refuse, dated Feb. 11, 2015, received in European Patent Application No. 11184224.1, which corresponds with U.S. Appl. No. 12/042,299, 10 pages.
Office Action, dated Sep. 12, 2012, received in European Patent Application No. 11184223.3, which corresponds with U.S. Appl. No. 12/042,299, 4 pages.
Decision to refuse, dated Feb. 11, 2015, received in European Patent Application No. 11184223.3, which corresponds with U.S. Appl. No. 12/042,299, 10 pages.
Office Action, dated Sep. 12, 2012, received in European Patent Application No. 11184222.5, which corresponds with U.S. Appl. No. 12/042,299, 4 pages.

(56) References Cited

OTHER PUBLICATIONS

Decision to refuse dated Feb. 11, 2015, received in European Patent Application No. 11184222.5, which corresponds with U.S. Appl. No. 12/042,299, 10 pages.
Office Action, dated Aug. 15, 2011, received in Japanese Patent Application No. 2010-502358, which corresponds with U.S. Appl. No. 12/042,299, 2 pages.
Decision to Grant, dated Mar. 23, 2012, received in Japanese Patent Application No. 2010-502358, which corresponds with U.S. Appl. No. 12/042,299, 5 pages.
Office Action, dated Sep. 6, 2013, received in Japanese Patent Application No. 2012-088747, which corresponds with U.S. Appl. No. 12/042,299, 4 pages.
Office Action, dated Aug. 11, 2014, received in Japanese Patent Application No. 2012-088747, which corresponds with U.S. Appl. No. 12/042,299, 1 page.
Decision to Grant, dated Feb. 16, 2015, received in Japanese Patent Application No. 2012-088747, which corresponds with U.S. Appl. No. 12/042,299, 3 pages.
Office Action, dated Nov. 30, 2015, received in Japanese Patent Application No. 2014-250268, which corresponds with U.S. Appl. No. 12/042,299, 4 pages.
Decision to Grant, dated Jun. 6, 2016, received in Japanese Patent Application No. 2014-250268, which corresponds with U.S. Appl. No. 12/042,299, 4 pages.
Letters Patent, dated Jul. 15, 2016, received in Japanese Patent Application No. 2014-250268, which corresponds with U.S. Appl. No. 12/042,299, 2 pages.
Notice of Allowance, dated Jun. 13, 2013, received in U.S. Appl. No. 13/077,927, 10 pages.
Office Action, dated Jan. 3, 2013, received in U.S. Appl. No. 13/077,931, 13 pages.
Final Office Action, dated Sep. 9, 2013, received in U.S. Appl. No. 13/077,931, 14 pages.
Office Action, dated Jul. 17, 2014, received in U.S. Appl. No. 13/077,931, 21 pages.
Office Action, dated Aug. 20, 2015, received in U.S. Appl. No. 13/077,931, 22 pages.
Notice of Allowance, dated Dec. 31, 2014, received in U.S. Appl. No. 13/077,931, 8 pages.
Notice of Allowance, dated Jan. 14, 2016, received in U.S. Appl. No. 13/077,931, 8 pages.
Office Action, dated Nov. 21, 2012, received in U.S. Appl. No. 13/163,624, 9 pages.
Office Action, dated Mar. 22, 2013, received in U.S. Appl. No. 13/163,624, 9 pages.
Office Action, dated Oct. 24, 2013, received in U.S. Appl. No. 13/163,624, 8 pages.
Notice of Allowance, dated May 12, 2014, received in U.S. Appl. No. 13/163,624, 5 pages.
Office Action, dated Mar. 20, 2013, received in U.S. Appl. No. 13/163,626, 8 pages.
Office Action, dated Nov. 26, 2012, received in U.S. Appl. No. 13/163,626, 8 pages.
Office Action, dated Oct. 24, 2013, received in U.S. Appl. No. 13/163,626, 8 pages.
Notice of Allowance, dated Mar. 31, 2014, received in U.S. Appl. No. 13/163,626, 5 pages.
Office Action, dated Dec. 30, 2010, received in U.S. Appl. No. 12/042,237, 9 pages.
Final Office Action, dated Jun. 2, 2011, received in U.S. Appl. No. 12/042,237, 9 pages.
Office Action, dated Sep. 14, 2011, received in U.S. Appl. No. 12/042,237, 8 pages.
Notice of Allowance, dated Mar. 6, 2012, received in U.S. Appl. No. 12/042,237, 8 pages.
Office Action, dated Jul. 14, 2011, received in Chinese Patent Application No. 200980000015.5, which corresponds with U.S. Appl. No. 12/042,237, 2 pages.
Office Action, dated Feb. 22, 2012, received in Chinese Patent Application No. 200980000015.5, which corresponds with U.S. Appl. No. 12/042,237, 2 pages.
Office Action, dated Sep. 11, 2012, received in Chinese Patent Application No. 200980000015.5, which corresponds with U.S. Appl. No. 12/042,237, 1 page.
Office Action, dated Sep. 26, 2012, received in German Patent Application No. 112009000002.9, which corresponds with U.S. Appl. No. 12/042,237, 5 pages.
Office Action, dated Jul. 12, 2010, received in European Patent Application No. 09700008.7, which corresponds with U.S. Appl. No. 12/042,237, 3 pages.
Summons to oral proceedings, dated Mar. 10, 2015, received in European Patent Application No. 09700008.7, which corresponds with U.S. Appl. No. 12/042,299, 12 pages.
Summons to oral proceedings, dated Mar. 27, 2013, received in European Patent Application No. 09700008.7, which corresponds with U.S. Appl. No. 12/042,299, 4 pages.
Decision to Refuse, dated Oct. 8, 2013, received in European Patent Application No. 09700008.7, which corresponds with U.S. Appl. No. 12/042,237, 15 pages.
Decision to Grant, dated Dec. 2, 2015, received in European Patent Application No. 09700008.7, which corresponds with U.S. Appl. No. 12/042,237, 5 pages.
Decision to Grant, dated Apr. 14, 2016, received in European Patent Application No. 09700008.7, which corresponds with U.S. Appl. No. 12/042,237, 1 page.
Patent Certificate, dated May 11, 2016, received in European Patent Application No. 09700008.7, which corresponds with U.S. Appl. No. 12/042,237, 2 pages.
Office Action, dated Nov. 16, 2016, received in European Patent Application No. 15175530.3, which corresponds with U.S. Appl. No. 12/042,237, 4 pages.
Office Action, dated Sep. 2, 2013, received in Japanese Patent Application No. 2010-502357, which corresponds with U.S. Appl. No. 12/042,237, 11 pages.
Office Action, dated Mar. 4, 2013, received in Japanese Patent Application No. 2010-502357, which corresponds with U.S. Appl. No. 12/042,237, 2 pages.
Office Action, dated Jan. 16, 2012, received in Japanese Patent Application No. 2010-502357, which corresponds with U.S. Appl. No. 12/042,237, 2 pages.
Office Action, dated Sep. 24, 2013, received in Japanese Patent Application No. 2012-218235, which corresponds with U.S. Appl. No. 12/042,237, 3 pages.
Letters Patent, dated Oct. 31, 2014, received in Japanese Patent Application No. 2012-218235, which corresponds with U.S. Appl. No. 12/042,237, 2 pages.
Office Action, dated May 20, 2015, received in U.S. Appl. No. 13/221,827, 26 pages.
Office Action, dated Jun. 23, 2014, received in U.S. Appl. No. 13/221,827, 18 pages.
Office Action, dated Oct. 4, 2016, received in U.S. Appl. No. 13/221,827, 20 pages.
Notice of Allowance, dated Dec. 3, 2012, received in U.S. Appl. No. 13/221,830, 6 pages.
Notice of Allowance, dated May 23, 2012, received in U.S. Appl. No. 13/221,830, 7 pages.
Office Action, dated Nov. 4, 2011, received in U.S. Appl. No. 11/620,727, 15 pages.
Final Office Action, dated Mar. 12, 2012, received in U.S. Appl. No. 11/620,727, 20 pages.
Office Action, dated Aug. 15, 2012, received in U.S. Appl. No. 11/620,727, 19 pages.
Final Office Action, dated Mar. 7, 2013, received in U.S. Appl. No. 11/620,727, 23 pages.
Examiner's Answer, dated Feb. 13, 2014, received in U.S. Appl. No. 11/620,727, 2 pages.
Office Action, dated Jan. 6, 2012, received in Chinese Patent Application No. 200880001811.6, which corresponds with U.S. Appl. No. 11/620,727, 2 pages.

(56) References Cited

OTHER PUBLICATIONS

Office Action, dated Aug. 10, 2011, received in Chinese Patent Application No. 200880001811.6, which corresponds with U.S. Appl. No. 11/620,727, 3 pages.
Office Action, dated Oct. 21, 2010, received in Chinese Patent Application No. 200880001811.6, which corresponds with U.S. Appl. No. 11/620,727, 2 pages.
Office Action, dated Feb. 21, 2014, received in Chinese Patent Application No. 201210128932.5, which corresponds with U.S. Appl. No. 11/620,727, 2 pages.
Office Action, dated Oct. 30, 2014, received in Chinese Patent Application No. 201210128932.5, which corresponds with U.S. Appl. No. 11/620,727, 3 pages.
Office Action, dated May 11, 2015, received in Chinese Patent Application No. 201210128932.5, which corresponds with U.S. Appl. No. 11/620,727, 4 pages.
Office Action, dated Dec. 24, 2014, received in Chinese Patent Application No. 201210128915.1, which corresponds with U.S. Appl. No. 11/620,727, 2 pages.
Notice of Allowance, dated Feb. 5, 2016, received in Chinese Patent Application No. 201210128915.1, which corresponds with U.S. Appl. No. 11/620,727, 2 pages.
Certificate of Patent, dated Mar. 16, 2016, received in Chinese Patent Application, No. 201210128915.1, which corresponds with U.S. Appl. No. 11/620,727, 1 page.
Office Action, dated Nov. 15, 2014, received in Chinese Patent Application No. 201210128911.3, which corresponds with U.S. Appl. No. 11/620,727, 2 pages.
Office Action, dated Jan. 29, 2016, received in Chinese Patent Application No. 201210128911.3, which corresponds with U.S. Appl. No. 11/620,727, 6 pages.
Office Action, dated Dec. 19, 2011, received in European Patent Application No. 08705471.4, which corresponds with U.S. Appl. No. 11/620,727, 6 pages.
Office Action, dated Jan. 29, 2015, received in Patent Application No. 08705471.4, which corresponds with U.S. Appl. No. 11/620,727, 8 pages.
Office Action, dated Nov. 5, 2012, received in U.S. Appl. No. 13/221,836, 16 pages.
Final Office Action, dated May 15, 2013, received in U.S. Appl. No. 13/221,836, 22 pages.
Office Action, dated Oct. 30, 2013, received in U.S. Appl. No. 13/221,836, 31 pages.
Final Office Action, dated May 20, 2014, received in U.S. Appl. No. 13/221,836, 36 pages.
Decision on Appeal, dated Jan. 3, 2017, received in U.S. Appl. No. 13/221,836, 6 pages.
Notice of Allowance, dated Feb. 21, 2017, received in U.S. Appl. No. 13/221,836, 10 pages.
Office Action, dated Jul. 24, 2012, received in U.S. Appl. No. 13/221,837, 13 pages.
Final Office Action, dated Feb. 14, 2013, received in U.S. Appl. No. 13/221,837, 13 pages.
Examiner's Answer, dated Feb. 11, 2014, received in U.S. Appl. No. 13/221,837, 19 pages.
Office Action, dated Jan. 10, 2012, received in U.S. Appl. No. 13/251,121, 16 pages.
Final Office Action, dated Jul. 9, 2012, received in U.S. Appl. No. 13/251,121, 21 pages.
Final Office Action, dated Sep. 23, 2013, received in U.S. Appl. No. 13/251,121, 24 pages.
Office Action, dated May 1, 2013, received in U.S. Appl. No. 13/251,121, 17 pages.
Examiner's Answer, dated Apr. 29, 2014, received in U.S. Appl. No. 13/251,121, 41 pages.
Notice of Allowance, dated Sep. 20, 2016, received in U.S. Appl. No. 13/251,121, 7 pages.
Office Action, dated Jan. 31, 2012, received in U.S. Appl. No. 13/251,146, 16 pages.
Final Office Action, dated Jun. 20, 2012, received in U.S. Appl. No. 13/251,146, 14 pages.
Office Action, dated Apr. 11, 2013, received in U.S. Appl. No. 13/251,146, 15 pages.
Final Office Action, dated Oct. 2, 2013, received in U.S. Appl. No. 13/251,146, 20 pages.
Examiner's Answer, dated May 7, 2014, received in U.S. Appl. No. 13/251,146, 43 pages.
Office Action, dated Feb. 10, 2012, received in U.S. Appl. No. 13/251,150, 23 pages.
Final Office Action, dated Jul. 5, 2012, received in U.S. Appl. No. 13/251,150, 27 pages.
Office Action, dated Jun. 7, 2013, received in U.S. Appl. No. 13/251,150, 34 pages.
Final Office Action, dated Dec. 11, 2013, received in U.S. Appl. No. 13/251,150, 44 pages.
Examiner's Answer, dated Jun. 17, 2014, received in U.S. Appl. No. 13/251,150, 47 pages.
Notice of Allowance, dated Dec. 21, 2016, received in U.S. Appl. No. 13/251,150, 10 pages.
Office Action, dated Jan. 20, 2012, received in U.S. Appl. No. 13/251,152, 20 pages.
Final Office Action, dated Jun. 20, 2012, received in U.S. Appl. No. 13/251,152, 24 pages.
Office Action, dated Apr. 23, 2013, received in U.S. Appl. No. 13/251,152, 29 pages.
Final Office Action, dated Oct. 18, 2013, received in U.S. Appl. No. 13/251,152, 29 pages.
Examiner's Answer, dated May 21, 2014, received in U.S. Appl. No. 13/251,152, 45 pages.
Notice of Allowance, dated Sep. 7, 2016, received in U.S. Appl. No. 13/251,152, 8 pages.
Notice of Allowance, dated Dec. 1, 2016, received in U.S. Appl. No. 13/251,152, 8 pages.
Office Action, dated Aug. 29, 2012, received in U.S. Appl. No. 11/620,715, 15 pages.
Final Office Action, dated Mar. 1, 2013, received in U.S. Appl. No. 11/620,715 (5583), 15 pages.
Examiner's Answer, dated Feb. 13, 2014, received in U.S. Appl. No. 11/620,715, 22 pages.
Office Action, dated Jul. 21, 2011, received in Chinese Patent Application No. 200880001855.9, which corresponds with U.S. Appl. No. 11/620,715, 2 pages.
Office Action, dated Jun. 6, 2012, received in Chinese Patent Application No. 200880001855.9, which corresponds with U.S. Appl. No. 11/620,715, 3 pages.
Office Action, dated Nov. 5, 2012, received in Chinese Patent Application No. 200880001855.9, which corresponds with U.S. Appl. No. 11/620,715, 2 pages.
Office Action, dated Mar. 7, 2013, received in Chinese Patent Application No. 200880001855.9, which corresponds with U.S. Appl. No. 11/620,715, 1 page.
Office Action, dated Jul. 29, 2014, received in Chinese Patent Application No. 200880001855.9, which corresponds with U.S. Appl. No. 11/620,715, 14 pages.
Office Action, dated Oct. 20, 2014, received in European Patent Application No. 08712946.6, which corresponds with U.S. Appl. No. 11/620,715, 6 pages.
Office Action, dated Oct. 30, 2012, received in European Patent Application No. 08712946.6, which corresponds with U.S. Appl. No. 11/620,715, 5 pages.
Notice of Allowance, dated Dec. 21, 2016, received in European Patent Application No. 08712946.6, which corresponds with U.S. Appl. No. 11/620,715, 7 pages.
Office Action, dated Jun. 18, 2012, received in U.S. Appl. No. 13/464,800, 10 pages.
Notice of Allowance, dated Nov. 13, 2012, received in U.S. Appl. No. 13/464,800, 8 pages.
Notice of Allowance, dated Dec. 19, 2012, received in U.S. Appl. No. 13/464,800, 9 pages.
Office Action, dated Oct. 9, 2012, received in U.S. Appl. No. 13/084,472, 14 pages.

(56) References Cited

OTHER PUBLICATIONS

Final Office Action, dated Jun. 20, 2013, received in U.S. Appl. No. 13/084,472, 20 pages.
Office Action, dated Dec. 6, 2013, received in U.S. Appl. No. 13/084,472, 23 pages.
Final Office Action, dated Jun. 17, 2014, received in U.S. Appl. No. 13/084,472, 31 pages.
Office Action, dated Dec. 10, 2014, received in U.S. Appl. No. 13/084,472, 24 pages.
Notice of Allowance, dated Jul. 7, 2015, received in U.S. Appl. No. 13/084,472, 8 pages.
Notice of Allowance, dated Oct. 26, 2015, received in U.S. Appl. No. 13/084,472, 8 pages.
Notice of Allowance, dated Jan. 15, 2014, received in U.S. Appl. No. 13/620,390, 10 pages.
Supplemental Notice of Allowance, dated Jan. 27, 2014, received in U.S. Appl. No. 13/620,390, 2 pages.
Office Action, dated Mar. 5, 2013, received in U.S. Appl. No. 13/670,378, 28 pages.
Notice of Allowance, dated Jul. 24, 2013, received in U.S. Appl. No. 13/670,378, 9 pages.
Office Action, dated Feb. 26, 2016, received in U.S. Appl. No. 14/043,774, 5 pages.
Notice of Allowance, dated Jun. 27, 2016, received in U.S. Appl. No. 14/043,774, 7 pages.
Office Action, dated Apr. 28, 2015, received in U.S. Appl. No. 13/791,621, 6 pages.
Notice of Allowance, dated Nov. 5, 2015, received in U.S. Appl. No. 13/791,621, 5 pages.
Notice of Allowance, dated Mar. 1, 2016, received in U.S. Appl. No. 13/791,621, 7 pages.
Office Action, dated Apr. 27, 2016, received in U.S. Appl. No. 14/290,931, 12 pages.
Final Office Action, dated Nov. 25, 2016, received in U.S. Appl. No. 14/290,931, 13 pages.
Notice of Allowance, dated Apr. 7, 2017, received in U.S. Appl. No. 14/290,931, 11 pages.
Office Action, dated Nov. 2, 2016, received in U.S. Appl. No. 14/290,931, 21 pages.
Office Action, dated Jan. 4, 2016, received in U.S. Appl. No. 14/171,680, 7 pages.
Notice of Allowance, dated Apr. 18, 2016, received in U.S. Appl. No. 14/171,680, 5 pages.
Notice of Allowance, dated May 28, 2015, received in U.S. Appl. No. 14/180,267, 11 pages.
Notice of Allowance, dated Sep. 15, 2015, received in U.S. Appl. No. 14/180,267, 5 pages.
Notice of Allowance, dated Dec. 31, 2015, received in U.S. Appl. No. 14/180,267, 5 pages.
Notice of Allowance, dated Feb. 11, 2016, received in U.S. Appl. No. 14/180,267, 2 pages.
Office Action, dated Sep. 12, 2016, received in U.S. Appl. No. 15/197,704, 7 pages.
Notice of Allowance, dated Jan. 20, 2017, received in U.S. Appl. No. 15/197,704, 5 pages.
Extended European Search Report, dated Dec. 7, 2011, received in European Patent Application No. 11184186.2, which corresponds to U.S. Appl. No. 12/566,660, 6 pages.
International Search Report and Written Opinion, dated Oct. 5, 2010, received in International Patent Application No. PCT/US2010/027118, which corresponds with U.S. Appl. No. 12/566,660, 15 pages.
International Preliminary Report on Patentability, dated Sep. 20, 2011, received in International Patent Application No. PCT/US2010/027118, which corresponds with U.S. Appl. No. 12/566,660, 10 pages.
International Search Report and Written Opinion, dated Jun. 1, 2011, received in International Patent Application No. PCT/US2011/020404, which corresponds with U.S. Appl. No. 12/789,684, 7 pages.
International Preliminary Report on Patentability, dated Jul. 10, 2012, received in International Patent Application No. PCT/US2011/020404, which corresponds with U.S. Appl. No. 12/789,684, 5 pages.
Extended European Search Report, dated May 20, 2011, received in European Patent Application No. 11152015.1, which corresponds with U.S. Appl. No. 12/789,695, 9 pages.
International Search Report and Written Opinion, dated May 20, 2011, received in International Patent Application No. PCT/US2011/022516, which corresponds with U.S. Appl. No. 12/789,695, 13 pages.
International Preliminary Report on Patentability, dated Aug. 9, 2012, received in International Patent Application No. PCT/US2011/022516, which corresponds with U.S. Appl. No. 12/789,695, 11 pages.
International Search Report and Written Opinion, dated Dec. 13, 2011, received in International Patent Application No. PCT/US11/039583, which corresponds with U.S. Appl. No. 12/892,848, 10 pages.
International Preliminary Report on Patentability, dated Dec. 14, 2012, received in International Patent Application No. PCT/US2011/039583, which corresponds with U.S. Appl. No. 12/892,848, 7 pages.
International Search Report and Written Opinion, dated Jun. 1, 2012, received in International Patent Application No. PCT/US2011/065859, which corresponds with U.S. Appl. No. 13/077,925, 21 pages.
International Preliminary Report on Patentability, dated Jun. 25, 2013, received in International Patent Application No. PCT/US2011/065859, which corresponds with U.S. Appl. No. 13/077,925, 15 pages.
Extended European Search Report, dated Apr. 21, 2009, received in European Patent Application No. 09154313.2, which corresponds with U.S. Appl. No. 12/042,318, 6 pages.
Extended European Search Report, dated Mar. 2, 2011, received in European Patent Application No. 11150786.9, which corresponds with U.S. Appl. No. 12/042,318, 5 pages.
Extended European Search Report, dated Mar. 1, 2011, received in European Patent Application No. 11150788.5, which corresponds with U.S. Appl. No. 12/042,318, 6 pages.
Extended European Search Report, dated Nov. 23, 2011, received in European Patent Application No. 11184167.2, which corresponds with U.S. Appl. No. 12/042,318, 6 pages.
Extended European Search Report, dated Nov. 24, 2011, received in European Patent Application No. 11184169.8, which corresponds with U.S. Appl. No. 12/042,318, 6 pages.
Extended European Search Report, dated Nov. 18, 2011, received in European Patent Application No. 11184170.6, which corresponds with U.S. Appl. No. 12/042,318, 6 pages.
Extended European Search Report, dated Nov. 18, 2011, received in European Patent Application No. 11184172.2, which corresponds with U.S. Appl. No. 12/042,318, 6 pages.
Extended European Search Report, dated Jun. 5, 2012, received in European Patent Application No. 12156394.4, which corresponds with U.S. Appl. No. 12/042,318, 4 pages.
Extended European Search Report, dated Jul. 9, 2012, received in European Patent Application No. 12156395.1, which corresponds with U.S. Appl. No. 12/042,318, 8 pages.
International Search Report and Written Opinion, dated Apr. 16, 2009, received in International Patent Application No. PCT/US2009/034772, which corresponds with U.S. Appl. No. 12/042,318, 9 pages.
International Preliminary Report on Patentability, dated Sep. 7, 2010, received in International Patent Application No. PCT/US2009/034772, which corresponds with U.S. Appl. No. 12/042,318, 7 pages.
Extended European Search Report, dated Feb. 28, 2013, received in European Patent Application No. 12188748.3, which corresponds with U.S. Appl. No. 12/042,067, 8 pages.
Extended European Search Report, dated Dec. 22, 2015, received in European Patent Application No. 15175530.3, which corresponds with U.S. Appl. No. 12/042,067, 9 pages.

(56) References Cited

OTHER PUBLICATIONS

International Search Report and Written Opinion, dated Jul. 3, 2009, received in International Patent Application No. PCT/US2009/035856, which corresponds with U.S. Appl. No. 12/042,067, 10 pages.
International Preliminary Report on Patentability, dated Sep. 16, 2010, received in International Patent Application No. PCT/US2009/035856, which corresponds with U.S. Appl. No. 12/042,067, 6 pages.
Extended European Search Report, dated Jan. 13, 2012, received in European Patent Application No. 11184226.6, which corresponds with U.S. Appl. No. 12/042,299, 7 pages.
Extended European Search Report, dated Jan. 13, 2012, received in European Patent Application No. 11184224.1, which corresponds with U.S. Appl. No. 12/042,299, 7 pages.
Extended European Search Report, dated Jan. 13, 2012, received in European Patent Application No. 11184223.3, which corresponds with U.S. Appl. No. 12/042,299, 4 pages.
Extended European Search Report, dated Jan. 13, 2012, received in European Patent Application No. 11184222.5, which corresponds with U.S. Appl. No. 12/042,299, 4 pages.
International Search Report and Written Opinion, dated Nov. 11, 2009, received in International Patent Application No. PCT/US2009/035874, which corresponds with U.S. Appl. No. 12/042,299, 10 pages.
International Preliminary Report on Patentability, dated Sep. 16, 2010, received in International Patent Application No. PCT/US2009/035874, which corresponds with U.S. Appl. No. 12/042,299, 7 pages.
International Search Report and Written Opinion, dated Jul. 3, 2009, received in International Patent Application No. PCT/US2009/035858, which corresponds with U.S. Appl. No. 12/042,237, 10 pages.
International Preliminary Report on Patentability, dated Sep. 7, 2010, received in International Patent Application No. PCT/US2009/035858, which corresponds with U.S. Appl. No. 12/042,237, 6 pages.
International Search Report and Written Opinion, dated Jun. 4, 2008, received in International Patent Application No. PCT/US2008/000089, which corresponds with U.S. Appl. No. 11/620,717, 10 pages.
International Preliminary Report on Patentability, dated Jul. 7, 2009, received in International Patent Application No. PCT/US2008/000089, which corresponds with U.S. Appl. No. 11/620,717, 9 pages.
International Search Report and Written Opinion, dated Apr. 22, 2008, received in International Patent Application No. PCT/US2008/000060, which corresponds with U.S. Appl. No. 11/620,717, 8 pages.
International Preliminary Report on Patentability, dated Jul. 7, 2009, received in International Patent Application No. PCT/US2008/000060, which corresponds with U.S. Appl. No. 11/620,727, 7 pages.
International Search Report and Written Opinion, dated May 2, 2008, received in International Patent Application No. PCT/US2008/000069, which corresponds with U.S. Appl. No. 11/620,715, 12 pages.
International Preliminary Report on Patentability, dated Jul. 7, 2009, received in International Patent Application No. PCT/US2008/000069, which corresponds with U.S. Appl. No. 11/620,715, 8 pages.
International Search Report and Written Opinion, dated Dec. 4, 2014, received in International Patent Application No. PCT/US2014/040406, which corresponds with U.S. Appl. No. 14/290,931, 9 pages.
International Preliminary Report on Patentability, dated Dec. 15, 2015, received in International Patent Application No. PCT/US2014/040406, which corresponds with U.S. Appl. No. 14/290,931, 6 pages.

Allen, "Override the GNU C Library—Painlessly," http://www.ibm.com/developerworks/linux/library/l-glibc/index.html, Apr. 1, 2002, 4 pages.
Anonymous, "Firegestures Version History: Add-ons for Firefox," Internet Article, http://addons.mozilla.org/en-US/firefox/addons/version/6366, Oct. 28, 2009, 6 pages.
Anonymous, "Firegestures: Changelog," Internet Article, http://www.xuldev.org/firegestures/changelong.php, Oct. 27, 2009, 8 pages.
Anonymous, "Firegestures: Firefox Extension," Internet Article, http://www.xuldev.org/firegesture/, Oct. 27, 2009, 2 pages.
Apple, "Safari Web Content Guide for iPhone," Apple Inc., Feb. 5, 2008, 96 pages.
*Apple Inc.* v. *HTC Corporation*, Brief Details of Claim, in the High Court of Justice, Chancery Division, Patents Court, Sep. 12, 2011, 2 pages.
*Apple Inc.* v. *HTC Corporation* Intervention of the Infringer according to Art. 105 EPC, Dec. 12, 2011, 24 pages.
*Apple* vs. *HTC*, Justice Floyd, Royal Courts of Justice, Jul. 4, 2012, 26 pages.
*Apple Inc.* v. *HTC Corporation*, Particulars of Claim, in the High Court of Justice, Chancery Division, Patents Court, Sep. 12, 2011, 4 pages.
*Apple Inc.* v. *HTC Corporation*, Particulars of Infringement, In the High Court of Justice, Chancery Division, Patents Court, Sep. 12, 2011, 5 pages.
*Apple* vs *HTC*, Reference to Complaint, Letter from Powell Gilbert, Apr. 5, 2012, 12 pages.
*Apple* vs *HTC*, Reference to Complaint, Letter from Powell Gilbert, Jul. 29, 2011, 22 pages.
*Apple Inc.* vs. *Samsung Electronics Co. Ltd. et al.*, Judgment, District Court of the Hague, Aug. 24, 2011, 65 pages.
*Apple Inc.* vs. *Samsung Electronics Co. Ltd., et al.*, Samsung's Motion to Supplement Invalidity, U.S. District Court, Jan. 27, 2012, 47 pages.
Ballard, "Microsoft Makes Research Technologies Available for Licensing," http://www.theserverside.com/news/thread.tss?thread_id=33761, May 5, 2005, 3 pages.
Bederson, "Photo Mesa 3.1.2, Screen Shots," May 24, 2006, 5 pages.
Benko et al., "Precise Selection Techniques for Multi-Touch Screens," Department of Computer Science, Columbia University, NY, Jan. 16, 2006, 10 pages.
Brown, et al., "Distributed Active Objects," Fifth International World Wide Web Conference, Paris, France, May 6-10, 1996, 18 pages.
Buxton, "Multi-Touch Systems that I Have Known and Loved," Jan. 12, 2007, http://www.billbuxton.com/multitouchOverview.html, 25 pages.
Chartier, "Apple Releases iOS 4.3 Beta for Developers," Macworld.com, www.macworld.com/article/1157114/ios_4_3.html, Jan. 12, 2011, 7 pages.
Chen, "The Web is Everywhere," IEEE Communications Magazine, Feb. 5, 2008, 1 page.
Davis, "Flash to the Core," http://www.amazon.com/Flash-Core-Joshua-David/dp/0735712881:Amazon.com, Jul. 24, 2002, 5 pages.
Dewid, "Scroll Control Box," IBM Technical Disclosure Bulletin, vol. 38, 04, Apr. 1993, 6 pages.
Dietz et al., "DiamondTouch: A Multi-User Touch Technology," Mitsubishi Electric Research Laboratories, Cambridge, Massachusetts, Oct. 2003, 11 pages.
Dodge et al., "Microsoft Office Excel 2003 Office Manual," Microsoft Press, vol. 1, Jul. 12, 2004, 5 pages.
Esenther et al., "Fluid DTMouse: Better Mouse Support for Touch-Based Interactions," Mitsubishi Electric Research Laboratories, Cambridge, Massachusetts, May 2006, 5 pages.
Feng et al., "Wireless Java Programming with Java 2 Micro Edition," ASCII Corporation, Kenichi Suzuki, Japan, May 11, 2002, 90 pages.
Flanagan, JavaScript, 5th Ed., O'Reilly Japan, Jan. 31, 2008, 35 pages.

(56) References Cited

OTHER PUBLICATIONS

Forlines et al., "DTLens: Multi-user Tabletop Spatial Data Exploration," Mitsubishi Electric Research Laboratories, Cambridge, Massachusetts, Oct. 2005, 5 pages.
Forlines et al., "Glimpse: A Novel Input Model for Multi-Level Devices," Mitsubishi Electric Research Laboratory, Cambridge, Massachusetts, Dec. 2005, 5 pages.
Han, "TED Ideas Worth Spreading," http://www.ted.com/talks/jeff_han_demos_his_breakthrough_touchscreen.html, Feb. 25, 2006, 1 page.
Holzner, "Built-in JavaScript Objects," JavaScript Complete, McGraw/Hill, New York, Jun. 1998, 9 pages.
iPhone Development Wiki, "UI GestureRecognizer", http://iphonedevwiki.net/index.php?title+UIGestureRecognizer&oldid=319, 3 pages.
Ivanov, "API Hooking Revealed", Code Project, www.codeproject.com/Articles/2082/API-hooking-revealed, Dec. 2, 2002, 16 pages.
JazzMutant, "Lemur v1.3 Examples Package: CursorModes.xml," http://www.jazzmutant.com/support_download.php>, Jan. 31, 2006, 4 pages.
JazzMutant, The Lemur Owner's Manual, 2005 JazzMutant SAS and Cycling '74, http://www.jazzmutant.com/support_download.php, Oct. 31, 2005, 108 pages.
JazzMutant, Lemur v1.3 Documentation Addendum, http://www.jazzmutant.com/support_download.php, Mar. 22, 2005, 3 pages.
JazzMutant, Lemur v1.3 Examples package: LightStepSeq.xml, http://www.jazzmutant.com/support_download.php, Jan. 31, 2006, 5 pages.
JazzMutant, Support, web.archive.org/web/20060421144624/http://www.jazzmutant.com/support_download.php, Apr. 21, 2006, 2 pages.
Karlson et al., AppLens and LaunchTile: Two Designs for One-handed Thumb Use on Small Devices, PowerPoint presentation, Computer Science Department, University of Maryland, College Park, MD, Apr. 2-7, 2005, 17 pages.
Karlson et al.,"AppLens and LaunchTile: Two Designs for One-handed Thumb Use on Small Devices," paper, Computer Science Department, University of Maryland, College Park, MD, Apr. 2-7, 2005, 10 pages.
KennyTM, "UIGestureRecognizer," from iPhone Development Wiki, Oct. 31, 2009, http://iphonedevwiki.net/index.php?title=UIGestureRecognizer&oldid=319http://iphonedevwiki.net/index.php?title=UIGestureRecognizer&action=history, 3 pages.
Kim et al., "HCI (Human Computer Interaction) Using Multi-touch Tabletop Display," Department of Computer Engineering, Chonnam National University, Gwangju Korea, Aug. 24, 2007, 4 pages.
Lin et al., "Embedded GUI Based on Linux OS and Design Improvement Thereof," May 13, 2004, 6 pages.
Maemo.org, "Coding Style and Programming Guidelines," http://maemo.org/development/documentation/manuals/3-x/maenno_coding_style_and_programming_guides, Nov. 28, 2007, 14 pages.
Masui et al., "Elastic Graphical Interfaces for Precise Data Manipulation," Software Research Laboratories, Sharp Corporation, Nara, Japan, Apr. 1995, 2 pages.
Matsuda et al., "Phosphorylcholine-endcapped oligomer and block co-oligomer and surface biological reactivity," Biomaterials, Jun. 24, 2003, 11 pages.
Mertz et al., "The Influence of Design Techniques on User Interfaces: the DigiStrips Experiment for Air Traffic Control," HCI-aero 2000, Toulouse, France, Sep. 2000, 6 pages.
"Microsoft Word 2003 Screen Shots," Microsoft 2003, 2 pages.
Microsoft, "Microsoft Windows Software Development Kit Update for Windows Vista," www.microsoft.com/en-us/download/details.aspx?displaylang=en&id=23719, Mar. 22, 2007, 26 pages.
Microsoft, Window Styles—Microsoft Windows SDK—Screenshot, Mar. 22, 2007, 2 pages.
Miller, "Archive—Java Technology Products Download, PersonalJava Application Environment," http://java.sun.com/products/personaljava/touchable/, Apr. 13, 2006, 12 pages.

Millhollon, "Microsoft Office Word 2003 Inside Out," Microsoft Press, Redmond, Washington, Oct. 2, 2003, 7 pages.
Nathan, "Silverlight 1.0 Unleashed," Sam's Publishing, XP055236068, ISBN: 978-0-672-33007-0, Oct. 16, 2007, 271 pages. (Part One & Part Two).
Nokia, "Hildon User Interface Style Guide Summary," Version 1.1, Apr. 12, 2006, 15 pages.
Olsen, "Building Interactive Systems: Principles for Human-Computer Interaction," Jan. 7, 2009, 6 pages.
Olsen, "Developing User Interfaces," Morgan Kaufmann Publishers, San Francisco, California, 1998, Chapter 4, 40 pages.
Petzold, "Programming Microsoft Windows with C#," Core Reference, Jan. 18, 2002, 5 pages.
Pixley, "Document Object Model (DOM) Level 2 Events Specification, Version 1," Netscape Communications Corp., W3C, Nov. 13, 2000, 47 pages.
Plaisant et al., "Touchscreen Toggle Design," Human-Computer Interaction Laboratory, University of Maryland, College Park, MD, May 3-7, 1992, 2 pages.
Pleading notes Mr. B.J. Berghuis van Woortman, Aug. 10-11, 2010, 16 pages.
Pleading notes Mr. Kleemans, Mr Blomme and Mr Van Oorschot, Aug. 10, 2011, 35 pages.
Pogue, "Windows Vista for Starters: The Missing Manual," Safari Books Online, Jan. 25, 2007, 18 pages.
Quinn Emanuel, *Apple Inc.* vs. *Samsung Electronics Co. Ltd., et al.*, Samsung's Patent Local Rule 3-3 and 3-4 Disclosures, U.S. District Court, Oct. 7, 2011, 287 pages.
Quinn Emanuel, Translation Letter to the EPO, dated Apr. 11, 2012, received in European Patent Application No. 08713567.9, 53 pages.
Quinn Emanuel on behalf of Motorola, Statement letter re Notice of the Opposition Division, Dec. 3, 2013, 13 pages.
Quinn Emanuel on behalf of Motorola, Statement letter re briefs, Jan. 21, 2014, 9 pages.
Quinn Emanuel, response to Appeal Proceedings for European Patent Application No. 09154313.2 (EP 2 098 948 B1), which corresponds with U.S. Appl. No. 12/042,318, Dec. 8, 2014, 34 pages.
Räihä, "Delegation: Dynamic Specialization," Department of Computer Science, University of Tempere, Finland, Nov. 11, 1994, 8 pages.
Ramachandran et al., "An Architecture for Ink Annotations on Web Documents," Proceedings of the 7th International Conference on Document Analysis and Recognition, Aug. 3-6, 2003, 5 pages.
Rappin et al., "wxPython in Action," Manning Publications, http://up07.net/t2az7xty4dpz/sharebookpro.com_350770414.rar, Mar. 2006, 40 pages.
Rogers, "It's for You! An iPhone Development Primer for the Busy College Professor," Computer Science and Information Systems, Northwest Missouri State University, Maryville, MO, Oct. 1, 2009, 8 pages.
Rowan, "Breakthrough Internet Device, Eureka Man," available online at https://web.archive.org/web/20070709083626/http:/leurekaman.com/towards-multti-touch-in-the-browser, Jan. 31, 2007, 2 pages.
Rubine, "The Automatic Recognition of Gestures," submitted in partial fulfillment of the requirements for the degree of Doctor of Philosophy in Computer Science at Carnegie Mellon University, Dec. 1991, 285 pages.
Salmoni, "The Zooming User Interface," Advogato, Aug. 16, 2004, 14 pages.
Samsung, Statement of Defense also Counterclaim (Smartphones), Judge in Interlocutory Proceedings of the Court in The Hague, Jul. 20, 2011, 48 pages.
Samsung, Statement of Defense also Counterclaim (Tablets), Judge in Interlocutory Proceedings of the Court in The Hague, Jul. 20, 2011, 44 pages.
Sells, Windows Forms Programming in C#, Microsoft.net Development Series, Mar. 1, 2004, 9 pages.
Shen et al., "Informing the Design of Direct-Touch Tabletops,", Mitsubishi Electric Research Labs, Oct. 2006, 11 pages.
Tidwell, "Magnetism, Designing Interfaces: Patterns for Effective Interaction Design," O'Reilly Media, Inc., Nov. 21, 2005, 2 pages.

(56) References Cited

OTHER PUBLICATIONS

Touch, "A Glance at Touch," Technology Handbook, http://www.carrolltouch.com, Jun. 7, 1998, 37 pages.
W3C, "Document Object Model (DOM) Level 2 Events Specifications," Version 1.0, Nov. 13, 2000, 47 pages.
Venners, "Java's Security Architecture; Java's Security Model and Built-In Safety Features," JavaWorld, Jul. 1997, 7 pages.
Wagner & Geyer, Remarks submitted for the Opposition Division, Aug. 10, 2012, 73 pages.
Webster's Dictionary, Definition of the word "Contemporaneous", Jan. 21, 2014, 2 pages.
Westerman, "Hand Tracking Finger Identification and Chordic Manipulation on a Multi-touch Surface," a dissertation submitted to the Faculty of the University of Delaware in partial fulfillment of the requirements for the degree of Doctor of Philosophy in Electrical Engineering, Mar. 20, 1999, 363 pages.
Wikibooks, "Java Programming/Applets/Event Listeners," en.wikibooks.org/w/index.php?title=Java_Programming/Applets/Event Listeners&oldid=849558, May 1, 2007, 6 pages.
Withers & Rogers LLP, *Apple* vs. *Samsung*, Proprietor's Response to Communication under Rule 79(1) EPC, dated Mar. 8, 2012, 8 pages.
*Withers & Rogers*, Apple's Response to Notice of Intervention from Motorola, Jun. 21, 2012, 3 pages.
Withers & Rogers, Apple's Response to Addendum from Samsung, Jun. 21, 2012, 3 pages.
Withers & Rogers, Preliminary Response to Opponent O1's written submissions, Dec. 3, 2013, 11 pages.
Withers Rogers, Revised Second Auxiliary Request, Jan. 30, 2014, 8 pages.
Withers Rogers, Grounds of Appeal in support of the Notice of Appeal, Aug. 4, 2014, 24 pages.
Withers Rogers, Comments on Sections 3.1 and 3.4 of the Withdrawn Appeal, Oct. 14, 2014, 3 pages.
YouTube, "A Lemurized Formula," http://www.youtube.com/watch?v=sHAMyQak-LM, Dec. 15, 2007, 1 page.
Zimmerman & Partner, *Samsung Electronics GmbH/Apple Inc.* vs *EP 2 126 678 B1* (08713567.9) Opposition, Jan. 30, 2012, 27 pages.
Zimmermann & Partner, Response to Summons letter, Nov. 7, 2013, 33 pages.
Zimmermann & Partner, Response to letter dated Jan. 3, 2014, 10 pages.
Office Action, dated Apr. 1, 2009, received in U.S. Appl. No. 11/620,709, 8 pages.
Office Action, dated Jun. 9, 2010, received in U.S. Appl. No. 11/620,709, 8 pages.
Office Action, dated Nov. 13, 2009, received in U.S. Appl. No. 11/620,709, 8 pages.
Office Action, dated Jul. 21, 2010, received in U.S. Appl. No. 11/620,710, 29 pages.
Office Action, dated Jan. 20, 2015, received in European Patent Application No. 08712964.9, which corresponds with U.S. Appl. No. 11/620,717, 8 pages.
Office Action, dated Jan. 29, 2012, received in Chinese Patent Application No. 200880001827.7, which corresponds with U.S. Appl. No. 11/620,717, 5 pages.
Office Action, dated Jul. 2, 2013, received in Chinese Patent Application No. 200880001827.7, which corresponds with U.S. Appl. No. 11/620,717, 1 page.
Office Action, dated Jul. 8, 2009, received in U.S. Appl. No. 11/620,717, 6 pages.
Office Action, dated Jul. 20, 2010, received in U.S. Appl. No. 11/620,717, 11 pages.
Office Action, dated Nov. 11, 2010, received in Chinese Patent Application No. 200880001827.7, which corresponds with U.S. Appl. No. 11/620,717, 2 pages.
Office Action, dated Nov. 26, 2012, received European Patent Application No. 08712964.9, which corresponds with U.S. Appl. No. 11/620,717, 6 pages.
Office Action, dated Dec. 29, 2009, received in U.S. Appl. No. 11/620,717, 8 pages.
Office Action, dated Jun. 23, 2009, received in U.S. Appl. No. 11/620,720, 17 pages.
Office Action, dated Nov. 18, 2009, received in U.S. Appl. No. 11/620,720, 17 pages.
Office Action, dated Dec. 23, 2008, received in U.S. Appl. No. 11/620,720, 18 pages.
Office Action, dated Apr. 1, 2009, received in U.S. Appl. No. 11/620,723, 8 pages.
Office Action, dated Jun. 8, 2010, received in U.S. Appl. No. 11/620,723, 8 pages.
Office Action, dated Nov. 17, 2009, received in U.S. Appl. No. 11/620,723, 8 pages.
Office Action, dated Jan. 5, 2012, received in Chinese Patent Application No. 200800000019.9, which corresponds with U.S. Appl. No. 11/956,969, 2 pages.
Office Action, dated Jan. 30, 2012, received in Canadian Patent Application No. 2,658,177, which corresponds with U.S. Appl. No. 11/956,969, 1 page.
Office Action, dated Feb. 11, 2009, received in Australian Patent Application No. 2009200366, which corresponds with U.S. Appl. No. 11/956,969, 2 pages.
Office Action, dated Feb. 12, 2010, received in Japanese Patent Application No. 2009-544996, which corresponds with U.S. Appl. No. 11/956,969, 3 pages.
Office Action, dated Feb. 18, 2013, received in Chinese Patent Application No. 200800000019.9, which corresponds with U.S. Appl. No. 11/956,969, 2 pages.
Office Action, dated Feb. 19, 2009, received in Australian Patent No. 2008201540, which corresponds with U.S. Appl. No. 11/956,969, 2 pages.
Office Action, dated Mar. 2, 2012, received in Australian Patent Application No. 2012100050, which corresponds with U.S. Appl. No. 11/956,969, 1 page.
Office Action, dated Apr. 8, 2010, received in Australian Patent Application No. 2009208103, which corresponds with U.S. Appl. No. 11/956,969, 2 pages.
Office Action, dated Apr. 14, 2011, received in Australian Patent Application No. 2009208103, which corresponds with U.S. Appl. No. 11/956,969, 3 pages.
Office Action, dated Apr. 15, 2013, received in Japanese Patent Application No. 2010-157303, which corresponds with U.S. Appl. No. 11956,969, 4 pages.
Office Action, dated May 15, 2013, received in Korean Patent Application No. 2009-7007114, which corresponds with U.S. Appl. No. 11/956,969, 2 pages.
Office Action, dated Jun. 1, 2011, received in Japanese Patent Application No. 2009-544996, which corresponds with U.S. Appl. No. 11/956,969, 1 page.
Office Action, dated Jun. 21, 2012, received in European Patent Application No. 08713567.9, which corresponds with U.S. Appl. No. 11/956,969, 2 pages.
Office Action, dated Jun. 22, 2011, received in Canadian Patent Application No. 2,658,177, which corresponds with U.S. Appl. No. 11/956,969, 2 pages.
Office Action, dated Jun. 25, 2013, received in Korean Patent Application No. 2013-7000337, which corresponds with U.S. Appl. No. 11/956,969, 3 pages.
Office Action, dated Jul. 1, 2008, received in Australian Patent Application No. 2008100283, which corresponds with U.S. Appl. No. 11/956,969, 2 pages.
Office Action, dated Jul. 15, 2009, received in Australian Patent Application No. 2008201540, which corresponds with U.S. Appl. No. 11/956,969, 2 pages.
Office Action, dated Jul. 23, 2013, received in Chinese Patent Application No. 200800000019.9, which corresponds with U.S. Appl. No. 11/956,969, 2 pages.
Office Action, dated Aug. 27, 2009, received in Korean Patent Application No. 2009-7003574, which corresponds with U.S. Appl. No. 11/956,969, 1 page.

(56) References Cited

OTHER PUBLICATIONS

Office Action, Sep. 9, 2013, received in Australian Patent Application No. 2012200689, which corresponds with U.S. Appl. No. 11/956,969, 3 pages.
Office Action, dated Sep. 20, 2012, received in Chinese Patent Application No. 200800000019.9, which corresponds with U.S. Appl. No. 11/956,969, 1 page.
Office Action, dated Oct. 7, 2011, received in European Patent Application No. 08713567.9, which corresponds with U.S. Appl. No. 11/956,969, 1 page.
Office Action, dated Oct. 15, 2012, received in Japanese Patent Application No. 2010-157303, which corresponds with U.S. Appl. No. 11/956,969, 4 pages.
Office Action, dated Oct. 26, 2012, received in Japanese Patent Application No. 2010-157302, which corresponds with U.S. Appl. No. 11/956,969, 4 pages.
Office Action, dated Oct. 29, 2008, received in U.S. Appl. No. 11/956,969, 6 pages.
Office Action, dated Oct. 29, 2010, received in German Patent Application No. 112008000144.8, which corresponds with U.S. Appl. No. 11/956,969, 4 pages.
Office Action, dated Nov. 4, 2013, received in Canadian Patent Application No. 2,759090, which corresponds with U.S. Appl. No. 11/956,969, 3 pages.
Office Action, dated Nov. 7, 2013, received in Canadian Patent Application No. 2,759,091, which corresponds with U.S. Appl. No. 11/956,969, 4 pages.
Office Action, dated Nov. 9, 2011, received in Australian Patent Application No. 2011201639, which corresponds with U.S. Appl. No. 11/956,969, 2 pages.
Office Action, dated Nov. 19, 2010, received in Japanese Patent Application No. 2009-544996, which corresponds with U.S. Appl. No. 11/956,969, 6 pages.
Office Action, dated Nov. 23, 2010, received in Chinese Patent Application No. 200800000019.9, which corresponds with U.S. Appl. No. 11/956,969, 2 pages.
Office Action, dated Nov. 24, 2011, received in Australian Patent Application No. 2009208099, which corresponds with U.S. Appl. No. 11/956,969, 3 pages.
Office Action, dated Dec. 1, 2009, received in Canadian Patent Application No. 2,658,177, which corresponds with U.S. Appl. No. 11/956,969, 2 pages.
Office Action, dated Dec. 29, 2009, received in European Patent Application No. 08713567.9, which corresponds with U.S. Appl. No. 11/956,969, 5 pages.
Office Action, dated Mar. 30, 2012, received in U.S. Appl. No. 12/207,429, 9 pages.
Office Action, dated May 17, 2012, received in U.S. Appl. No. 12/270,805, 14 pages.
Office Action, dated Oct. 11, 2011, received in U.S. Appl. No. 12/270,805, 27 pages.
Office Action, dated Oct. 11, 2011, received in U.S. Appl. No. 12/270,807, 26 pages.
Office Action, dated May 11, 2012, received in U.S. Appl. No. 12/270,810, 12 pages.
Office Action, dated Jul. 11, 2012, received in U.S. Appl. No. 12/270,810, 17 pages.
Office Action, dated Oct. 12, 2011, received in U.S. Appl. No. 12/270,810, 12 pages.
Office Action, dated May 17, 2012, received in U.S. Appl. No. 12/270,812, 14 pages.
Office Action, dated Sep. 19, 2012, received in U.S. Appl. No. 12/270,812, 22 pages.
Office Action, dated Oct. 13, 2011, received in U.S. Appl. No. 12/270,812, 12 pages.
Office Action, dated Feb. 14, 2013, received in U.S. Appl. No. 12/270,815, 12 pages.
Office Action, dated May 17, 2012, received in U.S. Appl. No. 12/270,815, 11 pages.
Office Action, dated Oct. 11, 2011, received in U.S. Appl. No. 12/270,815, 12 pages.
Office Action, dated Feb. 23, 2012, received in U.S. Appl. No. 12/869,182, 5 pages.
Office Action, dated Jun. 20, 2012, received in U.S. Appl. No. 12/869,182, 6 pages.
Office Action, dated Oct. 24, 2011, received in U.S. Appl. No. 12/869,182, 7 pages.
Office Action, dated Dec. 12, 2012, received in U.S. Appl. No. 12/869,182, 5 pages.
Office Action, dated Jun. 26, 2013, received in U.S. Appl. No. 13/867,950, 5 pages.
Office Action, dated Oct. 22, 2013, received in U.S. Appl. No. 13/867,950, 8 pages.
Office Action, dated Nov. 15, 2013, received in U.S. Appl. No. 13/867,950, 7 pages.
Office Action, dated Sep. 24, 2014, received in U.S. Appl. No. 14/189,922, 7 pages.
Office Action, dated Feb. 3, 2012, received in Hong Kong Patent Application No. 10103983.1, which corresponds with U.S. Appl. No. 11/956,969, 2 pages.
Office Action, dated Jul. 26, 2013, received in U.S. Appl. No. 90/012,332, 61 pages.
Extended European Search Report, dated Nov. 29, 2011, received in European Patent Application No. 11182954.5, 6 pages.
Extended European Search Report, dated Nov. 30, 2011, received in European Patent Application No. 11182959.4, 5 pages.
Extended European Search Report, dated Jan. 12, 2011, received in European Patent Application No. 11182962.8, 8 pages.
Extended European Search Report, dated Jan. 12, 2011, received in European Patent Application No. 11182963.6, 7 pages.
International Search Report, dated May 31, 2005, received in International Patent Application No. PCT/US2005/000089, 7 pages.
International Preliminary Report on Patentability, dated Jun. 18, 2008, received in International Patent Application No. PCT/US2005/000089, 5 pages.
International Search Report, dated Jul. 31, 2008, received in International Patent Application No. PCT/US2008/000058, 7 pages.
International Preliminary Report on Patentability, dated Jul. 7, 2009, received in International Patent Application No. PCT/US2008/000058, 5 pages.
International Search Report, dated Mar. 6, 2008, received in International Patent Application No. PCT/US2008/000103, 11 pages.
International Preliminary Report on Patentability, dated Jul. 7, 2009, received in International Patent Application No. PCT/US2008/000103, 9 pages.
Malik, "An Exploration of Multi-Finger Interaction on Multi-Touch Surfaces", A thesis submitted in conformity with the requirements for the degree of Doctor of Philosophy Graduate Department of Computer Science—University of Toronto, Dec. 18, 2007, 184 pages.
Zimmerman & Partner, Samsung Electronics GMmbH, Supplement to Notice of Opposition, Apr. 5, 2011, 6 pages.
TR—Summons, dated Oct. 28, 2011, received in European Patent Application No. 08705751.9, 9 pages.
TR—Patent, dated May 20, 2011, received in Japanese Patent Application No. 2009544996, 1 page.
TR—Invitation to Pay Additional Fees, PCT Application PCT/US2008/050292, Jul. 18, 2008, 4 pages.
Patent, dated Apr. 19, 2017, received in Chinese Patent Application No. 201410299526.4, which corresponds with U.S. Appl. No. 12/566,660, 2 pages.
Office Action, dated Apr. 5, 2017, received in Chinese Patent Application No. 201410299325.4, which corresponds with U.S. Appl. No. 12/566,660, 8 pages.
Notice of Allowance, dated Jun. 20, 2017, received in Japanese Patent Application No. 2016-017396, which corresponds with U.S. Appl. No. 12/566,660, 5 pages.
Patent, dated Jul. 28, 2017, received in Japanese Patent Application No. 2016017396, which corresponds with U.S. Appl. No. 12/566,660, 2 pages.

(56) References Cited

OTHER PUBLICATIONS

Office Action, dated Jun. 13, 2017, received in Australian Patent Application No. 2016204905, which corresponds with U.S. Appl. No. 12/789,695, 4 pages.
Office Action, dated May 24, 2016, received in Chinese Patent Application No. 2013105574402, which corresponds with U.S. Appl. No. 12/789,695, 4 pages.
Office Action, dated Jul. 10, 2017, received in Chinese Patent Application No. 2016082000182820, which corresponds with U.S. Appl. No. 12/789,695, 3 pages.
Notice of Allowance, date Jul. 28, 2017, received in Japanese Patent Application No. 2016-098113, which corresponds with U.S. Appl. No. 12/789,695, 5 pages.
Office Action, dated May 12, 2017, received in Australian Patent Application No. 2016204284, which corresponds with U.S. Appl. No. 12/892,848, 2 pages.
Notice of Allowance, dated Jun. 5, 2017, received in Japanese Patent Application No. 2016-144701, which corresponds with U.S. Appl. No. 12/892,848, 5 pages.
Patent, dated Jun. 23, 2017, received in Japanese Patent Application No. 2016-144701, which corresponds with U.S. Appl. No. 12/892,848, 2 pages.
Final Office Action, dated Jun. 30, 2017, received in U.S. Appl. No. 12/892,851, 17 pages.
Decision to Grant, dated Jul. 20, 2017, received in European Patent Application No. 11808779.0, which corresponds with U.S. Appl. No. 13/077,925, 2 pages.
Grant, dated Aug. 4, 2017, received in Hong Kong Patent Application No. 13104376.1, which corresponds with U.S. Appl. No. 13/077,925, 1 page.
Office Action, dated Jun. 2, 2017, received in Japanese Patent Application No. 2016146769, which corresponds with U.S. Appl. No. 13/077,925, 7 pages.
Patent, dated Jun. 30, 2017, received in Korean Patent Application No. 2016-7020964, which corresponds with U.S. Appl. No. 13/077,925, 3 pages.
Office Action, dated Jul. 20, 2017, received in Korean Patent Application No. 2017-7018175, which corresponds with U.S. Appl. No. 13/077,925, 5 pages.
Patent, dated Apr. 19, 2017, received in European Patent Application No. 11184167.2, which corresponds with U.S. Appl. No. 12/042,318, 1 page.
Office Action, dated Jun. 2, 2017, received in Chinese Patent Application No. 201310053142.X, which corresponds with U.S. Appl. No. 12/042,067, 2 pages.
Notification of Grant, dated Nov. 6, 2013, received in Chinese Patent Application No. 200980000013.6, which corresponds with U.S. Appl. No. 12/042,299, 3 pages.
Office Action, dated Jul. 20, 2017, received in Chinese Patent Application No. 201410028534.5, which corresponds with U.S. Appl. No. 12/042,299.
Office Action, dated Apr. 26, 2017, received in Chinese Patent Application No. 2014100285627, which corresponds with U.S. Appl. No. 12/042,299, 5 pages.
Summons to Attend Oral Proceedings, dated Oct. 30, 2013, received in European Patent Application No. 11184224.1, which corresponds with U.S. Appl. No. 12/042,299, 5 pages.
Summons to Attend Oral Proceedings, dated Oct. 30, 2013, received in European Patent Application No. 11184223.3, which corresponds with U.S. Appl. No. 12/042,299, 5 pages.
Summons to Attend Oral Proceedings, dated Oct. 30, 2013, received in European Patent Application No. 11184222.5, which corresponds with U.S. Appl. No. 12/042,299, 5 pages.
Office Action, dated Jun. 2, 2017, received in Japanese Patent Application No. 2016-133582, which corresponds with U.S. Appl. No. 12/042,299, 5 pages.
Office Action, dated Apr. 27, 2017, received in Chinese Patent Application No. 201510175905.7, which corresponds with U.S. Appl. No. 12/042,237, 5 pages.

Office Action, dated Jun. 30, 2017, received in Chinese Patent Application No. 201510175915.0, which corresponds with U.S. Appl. No. 12/042,237, 5 pages.
Notice of Allowance, dated May 5, 2017, received in U.S. Appl. No. 13/221,827, 20 pages.
Patent, dated Jun. 2, 2017, received in Hong Kong Patent Application No. 13104177.2, which corresponds with U.S. Appl. No. 11/620,727, 2 pages.
Decision on Appeal, dated Jun. 2, 2017, received in U.S. Appl. No. 11/620,715, 10 pages.
Decision to Grant, dated May 11, 2017, received in European Patent Application No. 08712946.6, which corresponds with U.S. Appl. No. 11/620,715, 1 page.
Patent, dated Jul. 6, 2017, received in European Patent Application No. 08712946.6, which corresponds with U.S. Appl. No. 11/620,715, 1 page.
Notice of Allowance, dated Apr. 20, 2017, received in U.S. Appl. No. 14/188,635, 11 pages.
Notice of Allowance, dated May 18, 2017, received in U.S. Appl. No. 14/188,635, 5 pages.
Office Action, dated Jun. 30, 2017, recived in U.S. Appl. No. 15/046,252, 8 pages.
Notice of Allowance, dated May 5, 2017, received in U.S. Appl. No. 15/197,704, 5 pages.
Invitation to Pay Additional Fees, PCT Application PCT/US2010/027118, dated Jul. 13, 2010, 5 pages.
Invitation to Pay Additional Fees, PCT Application PCT/US2011/065859, dated Mar. 12, 2012, 5 pages.
Extended European Search Report, dated Aug. 4, 2017, received in European Patent Application No. 17158104.4, which corresponds with U.S. Appl. No. 12/042,318, 8 pages.
Apple Inc., "iPad User Guide for iOS 4.2 Software", http://support.apple.com/kb/index?page=answerlink&
url=http%3A%2F%2Fmanuals.infor.apple.
com%Fen_US%FiPad_iOS4_User_Guide.pdf&
answerid=16777220&src=support_site.manuals.search, Nov. 8, 2010, 181 pages.
Thornlund, "Gesture Analyzing for Multi-Touch Screen Interfaces", http://epubl.ltu.se/1404-5494/2007/30/LTU-HIP-EX-0730-SE.pdf, Sep. 17, 2007, 22 pages.
Notice of Allowance, dated Oct. 24, 2017, received in Canadian Patent Application No. 2,909,730, which corresponds with U.S. Appl. No. 12/566,660, 1 page.
Patent, dated Aug. 25, 2017, received in Chinese Patent Application No. 201410299325.4, which corresponds with U.S. Appl. No. 12/566,660, 4 pages.
Notice of Allowance, dated Oct. 24, 2017, received in Chinese Patent Application No. 201310557440.2, which corresponds with U.S. Appl. No. 12/789,695, 3 pages.
Patent Certificate, dated Dec. 5, 2017, received in Chinese Patent Application No. 201310557440.2, which corresponds with U.S. Appl. No. 12/789,695, 4 pages.
Patent, dated Sep. 1, 2017, received in Japanese Patent Application No. 2016098113, which corresponds with U.S. Appl. No. 12/789,695, 3 pages.
Notice of Acceptance, dated Nov. 15, 2017, received in Australian Patent Application No. 2016204284, which corresponds with U.S. Appl. No. 12/892,848, 3 pages.
Office Action, dated Oct. 24, 2017, received in Australian Patent Application No. 2017200807, which corresponds with U.S. Appl. No. 13/077,925, 3 pages.
Patent, Aug. 16, 2017, received in European Patent Application No. 11808779.0, which corresponds with U.S. Appl. No. 13/077,925, 2 pages.
Notice of Allowance, dated Oct. 6, 2017, received in Australian Patent Application No. 2016206268, which corresponds with U.S. Appl. No. 12/042,318, 3 pages.
Certificate of Granted, dated Oct. 27, 2017, received in Hong Kong Patent Application No. 12106622.9, which corresponds with U.S. Appl. No. 12/042,318, 2 pages.
Certificate of Granted, dated Nov. 3, 2017, received in Hong Kong Patent Application No. 12106623.8, which corresponds with U.S. Appl. No. 12/042,318, 2 pages.

(56) References Cited

OTHER PUBLICATIONS

Certificate of Grant, dated Nov. 3, 2017, received in Hong Kong Patent Application No. 12106624.7, which corresponds with U.S. Appl. No. 12/042,318, 2 pages.
Office Action, dated Nov. 3, 2017, received in Hong Kong Patent Application No. 13100042.3, which corresponds with U.S. Appl. No. 12/042,318, 2 pages.
Certificate of Grant, dated Oct. 13, 2017, received in Hong Kong Patent Application No. 13100043.2, which corresponds with U.S. Appl. No. 12/042,318, 2 pages.
Office Action, dated Sep. 8, 2017, received in Japanese Patent Application No. 2015-085361, which corresponds with U.S. Appl. No. 12/042,318, 4 pages.
Patent, dated Oct. 13, 2017, received in Japanese Patent Application No. 2015085361, which corresponds with U.S. Appl. No. 12/042,318, 2 pages.
Appeal Decision, dated Oct. 9, 2017, received in European Patent Application No. 12188748.3, which corresponds with U.S. Appl. No. 12/042,067, 16 pages.
Patent, dated Aug. 4, 2017, received in Honk Kong Application No. 10111901.3, which corresponds with U.S. Appl. No. 12/042,067, 2 pages.
Notice of Allowance, dated Nov. 28, 2017, received in Chinese Patent Application No. 2014100285627, which corresponds with U.S. Appl. No. 12/042,299, 3 pages.
Decision to Refuse Application, dated Sep. 6, 2017, received in European Patent Application No. 09700007.9, which corresponds with U.S. Appl. No. 12/042,299, 15 pages.
Summons to Attend Oral Proceedings, dated Dec. 6, 2017, received in European Patent Application No. 11184226.6, which corresponds with U.S. Appl. No. 12/042,299, 8 pages.
Office Action, dated Sep. 1, 2017, received in European Patent Application No. 11184224.1, which corresponds with U.S. Appl. No. 12/042,299, 6 pages.
Notice of Allowance, dated Nov. 17, 2017, received in Japanese Patent Application No. 2016-133582, which corresponds with U.S. Appl. No. 12/042,299, 5 pages.
Patent, dated Aug. 4, 2017, received in Honk Kong Application No. 10100282.5, which corresponds with U.S. Appl. No. 12/042,237, 2 pages.
Summons to Attend Oral Proceedings, dated Dec. 6, 2017, received in European Patent Application No. 08705471.4, which corresponds with U.S. Appl. No. 11/620,727, 6 pages.
Notice of Allowance, dated Dec. 19, 2017, received in U.S. Appl. No. 15/046,252, 5 pages.
Extended European Search Report, dated Oct. 18, 2017, received in European Patent Application No. 17177247.8, which corresponds to U.S. Appl. No. 13/077,925, 11 pages.
Extended European Search Report, dated Nov. 3, 2017, received in European Patent Application No. 17165698.6, which corresponds with U.S. Appl. No. 11/620,715, 9 pages.
European Search Report, dated Nov. 30, 2011, received in European Patent Application No. 11184409.8, which corresponds with U.S. Appl. No. 12/042,318, 6 pages.
Office Action, dated May 16, 2014, received in European Patent Application No. 11184409.8, which corresponds with U.S. Appl. No. 12/042,318, 6 pages.
Office Action, dated Apr. 22, 2015, received in European Patent Application No. 11184409.8, which corresponds with U.S. Appl. No. 12/042,318, 6 pages.

Office Action, dated Nov. 30, 2015, received in European Patent Application No. 11184409.8, which corresponds with U.S. Appl. No. 12/042,318, 4 pages.
Intention to Grant, dated Jul. 1, 2016, received in European Patent Application No. 11184409.8, which corresponds with U.S. Appl. No. 12/042,318, 5 pages.
Decision to Grant, dated Oct. 7, 2016, received in European Patent Application No. 11184409.8, which corresponds with U.S. Appl. No. 12/042,318, 2 pages.
Office Action, dated Feb. 15, 2018, received in U.S. Appl. No. 15/139,260, 22 pages.
Office Action, dated Jan. 19, 2018, received in U.S. Appl. No. 14/978,655, 13 pages.
Office Action, dated Jan. 25, 2018, received in U.S. Appl. No. 15/623,322, 14 pages.
Office Action, dated Jan. 8, 2018, received in European Patent Application No. 11184186.2 (5182EP01), which corresponds with U.S. Appl. No. 12/566,660, 4 pages.
Office Action, dated Jan. 26, 2018, received in Chinese Patent Application No. 201410198170.5 (5263CN03), which corresponds with U.S. Appl. No. 12/789,695, 4 pages.
Certificate of Grant, dated Mar. 22, 2018, received in Australian Patent Application No. 2016204284 (5293AU02), which corresponds with U.S. Appl. No. 12/892,848, 1 page.
Office Action, dated Feb. 23, 2018, received in Japanese Patent Application No. 2016-146769 (5336JP02), which corresponds with U.S. Appl. No. 13/077,925, 6 pages.
Notice of Allowance, dated Jan. 31, 2018, received in Korean Patent Application No. 2017-7018175 (5336KR03), which corresponds with U.S. Appl. No. 13/077,925, 4 pages.
Certificate of Grant, dated Feb. 1, 2018, received in Australian Patent Application No. 2013242854 (5339AU07), which corresponds with U.S. Appl. No. 12/042,318, 1 page.
Office Action, dated Feb. 2, 2018, received in Canadian Patent Application No. 2,931,604 (5339CA01), which corresponds with U.S. Appl. No. 12/042,318, 6 pages.
Certificate of Grant, dated Jan. 26, 2018, received in Hong Kong Patent Application No. 12106620.1 (5339HK03), which corresponds with U.S. Appl. No. 12/042,318, 4 pages.
Certificate of Grant, dated Jan. 26, 2018, received in Hong Kong Patent Application No. 12106621.0 (5339HK04), which corresponds with U.S. Appl. No. 12/042,318, 4 pages.
Office Action, dated Feb. 9, 2018, received in Chinese Patent Application No. 201410028534.5 (5344CN01), which corresponds with U.S. Appl. No. 12/042,299, 3 pages.
Patent, dated Feb. 9, 2018, received in Chinese Patent Application No. 2014100285627 (5344CN02), which corresponds with U.S. Appl. No. 12/042,299, 4 pages.
Patent, dated Jan. 5, 2018, received in Japanese Patent Application No. 2016133582 (5344JP03), which corresponds with U.S. Appl. No. 12/042,299, 2 pages.
Office Action, dated Feb. 1, 2018, received in Chinese Patent Application No. 201510175905.7 (5400CN01), which corresponds with U.S. Appl. No. 12/042,237, 3 pages.
Office Action, dated Jan. 17, 2018, received in Chinese Patent Application No. 201510175915.0 (5400CN02), which corresponds with U.S. Appl. No. 12/042,237, 3 pages.
Office Action, dated Feb. 2, 2018, received in Chinese Patent Application No. 201510379780.X (5583CN01), which corresponds with U.S. Appl. No. 11/620,715, 5 pages.

* cited by examiner

TOUCH EVENT MODEL

RELATED APPLICATIONS

This application is a continuation application of U.S. patent application Ser. No. 15/197,704, filed Jun. 29, 2016, which is a continuation application of U.S. patent application Ser. No. 14/171,680, filed Feb. 3, 2014, now U.S. Pat. No. 9,389,712, which is a continuation application of U.S. patent application Ser. No. 12/042,318, filed Mar. 4, 2008, now U.S. Pat. No. 8,645,827. All of these applications are incorporated by reference herein in their entireties.

FIELD OF THE INVENTION

This relates to multi-point and multi-touch enabled devices in general, and more specifically to recognizing single and multiple point and touch events in multi-point and multi-touch enabled devices.

BACKGROUND OF THE INVENTION

Multi-touch enabled devices are known in the art. A multi-touch enabled device is a device that can sense multiple touches at the same time. Thus, a multi-touch enabled device can, for example, sense two touch events that take place simultaneously at two different positions on a multi-touch panel and are caused by two fingers being pressed down on the panel. Examples of multi-touch enabled devices are discussed in U.S. patent application Ser. No. 11/649,998, entitled "Proximity and Multi-Touch Sensor Detection and Demodulation," filed on Jan. 3, 2007 and hereby incorporated by reference in its entirety. Multi-point enabled devices define a more general set of devices that include multi-touch enabled devices as well as similar devices such as the multi-proximity sensor devices discussed in U.S. patent application Ser. No. 11/649,998 mentioned above.

While the benefits of multi-touch enabled interfaces are known, these devices can present some interface design challenges. Existing interface design conventions have assumed a single pointing user input device that specifies a single location at a time. Examples include a mouse or a touch pad.

More specifically, many existing graphical user interface (GUI) systems provide user interfaces in which various portions of a display are associated with separate software elements. Thus, for example, portions of a display can be associated with a window, and the window can be associated with a specific software application and/or process. A mouse can be used to interact with the window and the application or process associated with that window. The mouse cursor can then be moved to another window to interact with another application or process. Because only a single pointing device is used, interaction with only a single window and application or process can occur at a time.

The assumption of a single interaction with a window at any one time can greatly simplify user interface design. The application and/or process running within a window can operate under the assumption that a detected interaction with that particular window is the only input being received. Thus, the application and/or process need not concern itself with the possibility of other user interactions occurring in other portions of the display outside that window. Furthermore, a window can be additionally partitioned into various elements, wherein each element is associated with a specific portion of the window. Each element can be implemented by a separate software element (e.g., a software object). Again, each software object can process interactions that occur in its associated area without concerning itself with interactions that may be simultaneously occurring elsewhere.

On the other hand, if a multi-touch interface is being used, two or more touch events can simultaneously occur at different portions of the display. This can make it difficult to split the display into different portions and have different independent software elements process interactions associated with each portion. Furthermore, even if the display is split up into different portions, multiple touch events can occur in a single portion. Therefore, a single application, process or other software element may need to process multiple simultaneous touch events. However, if each application, process or other software element needs to consider multiple touch interactions, then the overall cost and complexity of software running at the multi-touch enabled device may be undesirably high. More specifically, each application may need to process large amounts of incoming touch data. This can require high complexity in applications of seemingly simple functionality, and can make programming for a multi-touch enabled device generally difficult and expensive. Also, existing software that assumes a single pointing device can be very difficult to convert or port to a version that can operate on a multi-point or a multi-touch enabled device.

SUMMARY OF THE INVENTION

Embodiments of the present invention are directed to methods, software, devices and APIs for defining touch events for application level software. Furthermore, some embodiments are directed to simplifying the recognition of single and multiple touch events for applications running in multi-touch enabled devices. To simplify the recognition of single and multiple touch events, each view within a particular window can be configured as either a multi-touch view or a single touch view. Furthermore, each view can be configured as either an exclusive or a non-exclusive view. Depending on the configuration of a view, touch events in that and other views can be either ignored or recognized. Ignored touches need not be sent to the application. Selectively ignoring touches can allow for simpler applications or software elements that do not take advantage of advanced multi touch features to be executed at the same device (and even at the same time) as more complex applications or software elements.

DETAILED DESCRIPTION OF THE PREFERRED EMBODIMENT

Figure 1:
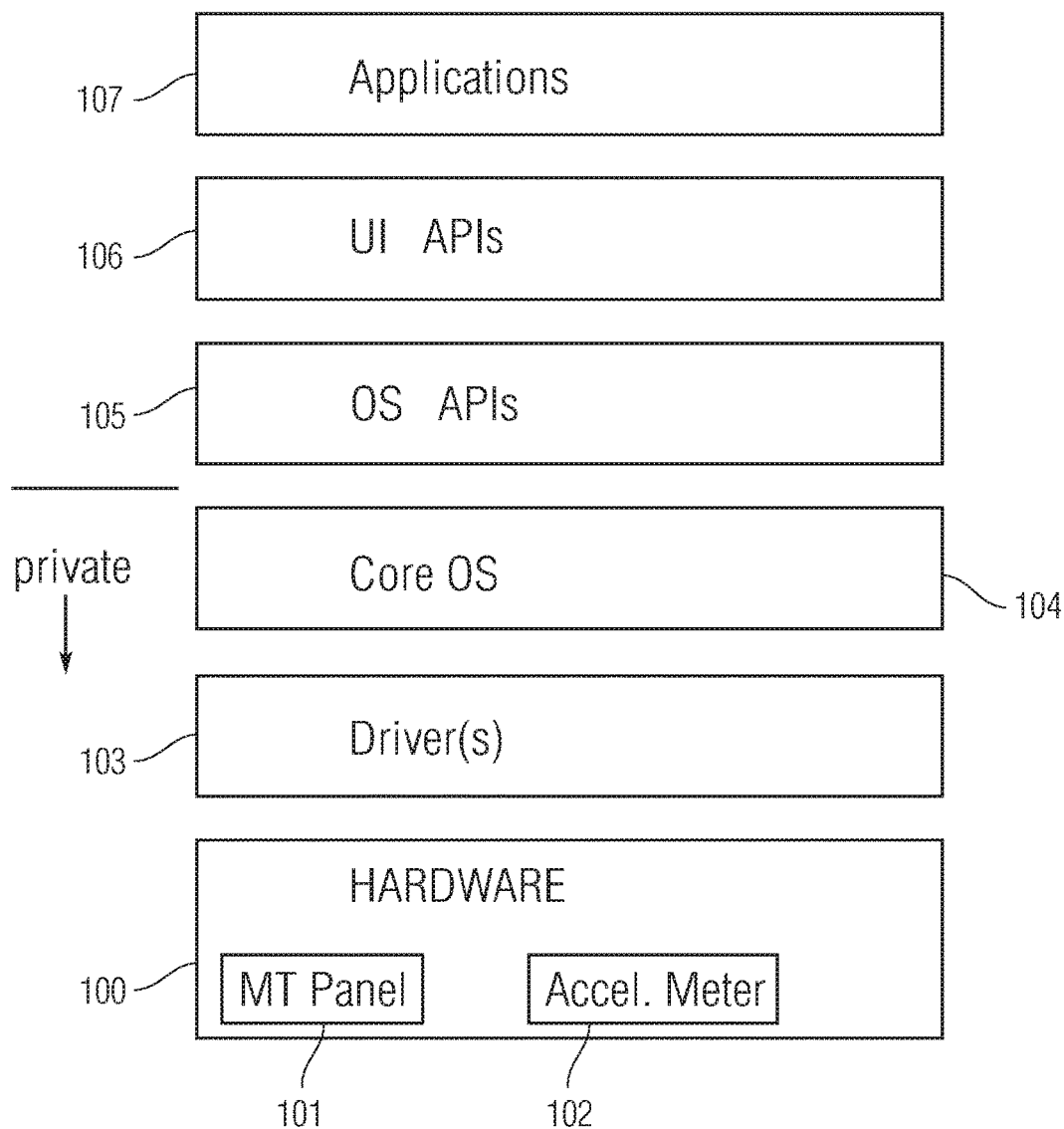
FIG. 1 is a diagram of an input/output processing stack of an exemplary multi-touch capable device according to one embodiment of this invention.

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

This relates to a touch event model that simplifies the recognition of single and multiple touch events for user interface applications running in multi-point and multi-touch enabled devices. To simplify the recognition of single and multiple touch events, each view within a particular window can be configured as either a multi-touch view or a single touch view. Furthermore, each view can be configured as either an exclusive or a non-exclusive view. Depending on the configuration of a view, touch events in that and other views can be either ignored or recognized.

Although embodiments of the present invention may be described and illustrated herein in terms of specific multi-touch capable devices, it should be understood that embodiments of the present invention are not limited to such devices, but is generally applicable to any multi-touch capable device. Furthermore, embodiments of the invention are not limited to multi-touch devices but also include multi-point devices, such as multi proximity sensor devices as discussed in U.S. application Ser. No. 11/649,998, mentioned above.

Some embodiments are related to APIs. In general, an API is a source code interface that a computer system provides in order to support requests for services from a software operation. An API is specified in terms of a program language that can be interpreted or compiled when a system is built, rather than an explicit low level description of how data is laid out in memory. The software that provides the functionality of an API is said to be an implementation of the API. Various devices such as computer systems, electronic devices, portable devices and handheld devices have software applications. The device interfaces between the software applications and user interface software to provide a user of the device with certain features and operations.

At least some embodiments of the invention can include one or more APIs in an environment with user interface software interacting with a software application. Various function calls or messages are transferred via the APIs between the user interface software and the software applications. Transferring the function calls or messages may include issuing, initiating, invoking or receiving the function calls or messages. Example APIs can include sending touch event information. An API may also implement functions having parameters, variables or pointers. An API may receive parameters as disclosed or other combinations of parameters. In addition to the APIs disclosed, other APIs individually or in combination can perform similar functionality as the disclosed APIs.

FIG. 1 is a diagram of an input/output processing stack of an exemplary multi-touch capable device according to some embodiments of the invention. Hardware 100 can be provided at the base level of a multi-touch enabled device. It can include various hardware interface components, such as a multi-touch enabled panel 101 and/or an accelerometer 102. The multi-touch panel can include a display and a panel that senses multiple touches simultaneously. An example of such a panel is discussed in more detail in the U.S. Ser. No. 11/649,998 application mentioned above. The accelerometer can be a hardware device that senses acceleration of the multi-touch enabled device. It can be used to sense when the device is being moved, how it is being moved, if it is dropped, etc. Other hardware interface devices, such as gyroscopes, speakers, buttons, infrared (IR) sensors, etc. (not shown) can also be included.

A driver or a set of drivers 103 can communicate with the hardware 100. The drivers can receive and process input data from received from the hardware. A core Operating System (OS) 104 can communicate with the driver(s). The core OS can process raw input data received from the driver(s). In some embodiments, the drivers can be considered to be a part of the core OS.

A set of OS application programming interfaces (APIs) 105 can communicate with the core OS. These APIs can be a set of APIs that are usually included with operating systems (such as, for example, Linux or UNIX APIs). User Interface APIs 106 (UI APIs) can include a set of APIs designed for use by applications running on the device. The UI APIs can utilize the OS APIs. Applications 107 running on the device can utilize the APIs of the UI APIs in order to communicate with the user. The UI APIs can, in turn, communicate with lower level elements, ultimately communicating with the multi-touch panel 101 and various other user interface hardware. While each layer can utilize the layer underneath it, that is not always required. For example, in some embodiments, applications 107 can occasionally communicate with OS APIs 105. APIs 105 and 106 can comprise respective sets of application programming interfaces as well as their respective implementations. For example UI APIs 106 can also include user interface (UI) software for implementing the UI APIs.

Figures 2A, 2B:
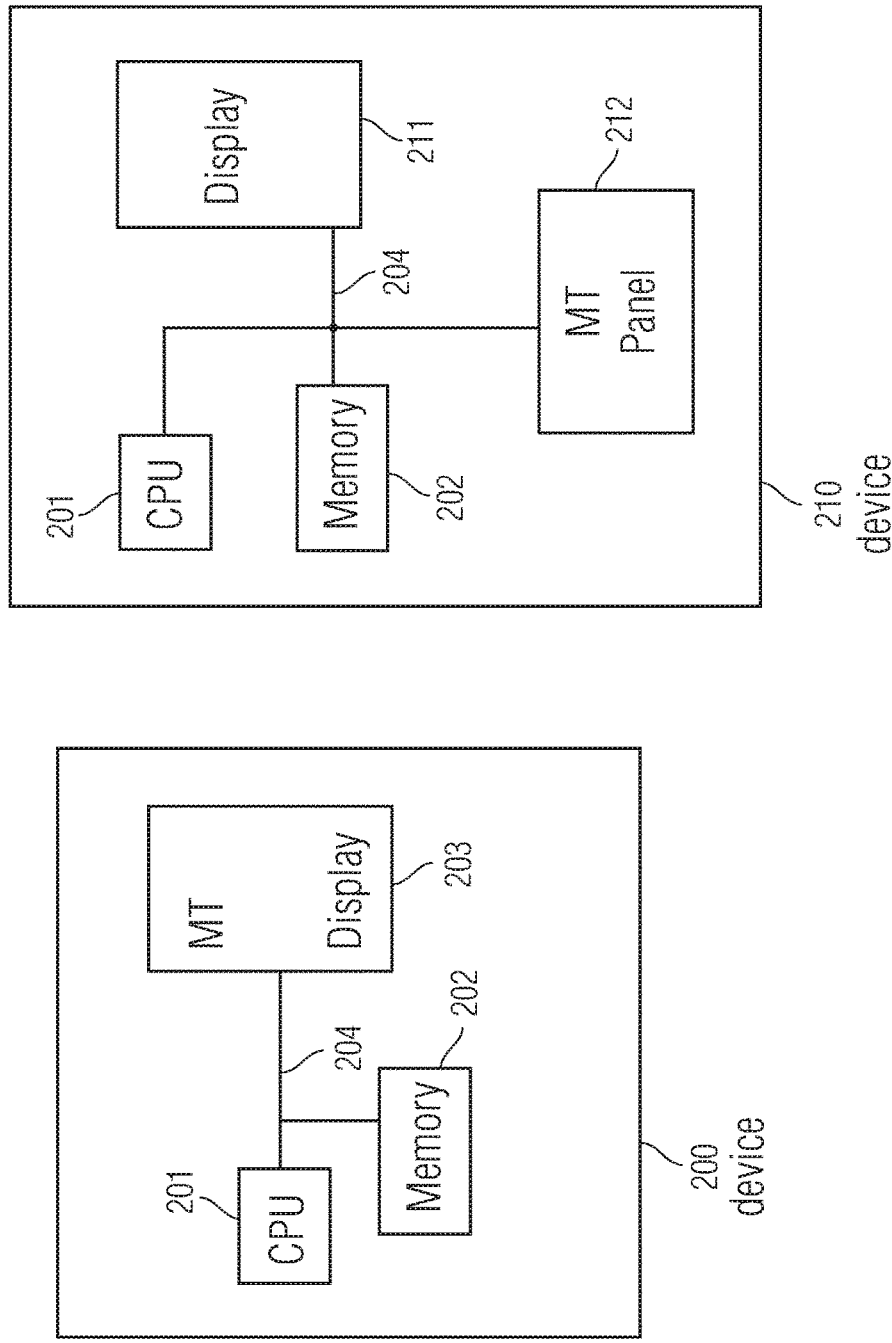
FIG. 2A is a diagram of an exemplary multi-touch enabled device according to one embodiment of this invention.
FIG. 2B is a diagram of another exemplary multi-touch enabled device according to one embodiment of this invention.

FIGS. 2A and 2B are diagrams of two types of exemplary multi-touch enabled devices according to some embodiments of the invention. FIG. 2A shows exemplary device 200. Device 200 can include a CPU 201 and a memory 202 connected through a bus 204. The bus can also connect to a multi-touch display 203. The multi-touch display can include a multi-touch panel and a display. The multi-touch panel and the display can be combined to form the multi-touch display 203. The multi-touch display can correspond to the multi-touch panel 101 within hardware layer 100 of FIG. 1. The CPU can be used to execute software stored in the memory. The software executed by the CPU can include layers 103-109 of FIG. 1. Thus, the software can include drivers, an OS, various APIs and applications.

FIG. 2B shows alternative device 210. Device 210 can be similar to device 200. However, device 210 can include a separate multi-touch panel (212) and display (211) instead of the single unit of device 200. Thus, for device 210 one need not touch the display in order to interact with the multi-touch panel. Device 210 can be, for example, a multi-touch track-pad equipped laptop computer (the multi-touch panel serving as a track pad).

The multi touch panel and/or display of FIGS. 2A and 2B can also utilize other sensory technology, such as proximity sensing, as discussed in U.S. application Ser. No. 11/649,998, mentioned above. Generally, a multi-point panel and/or display can be used for the devices of FIGS. 2A and 2B. The multi-point panel and/or display can feature various types of sensor technology. For example, it can feature multi-touch technology only (thus resulting in a multi-touch panel and/or display), multi-proximity sense technology, a combination of the two, or another type of multi-point technology.

The devices of FIGS. 2A and 2B can include various different types of multi-touch enabled devices. For example, they can include a mobile telephone, a portable video game console, an electronic music player, an e-book, a PDA, an electronic organizer, an e-mail device, a laptop or other personal computer, a kiosk computer, a vending machine, etc.

Figure 3:
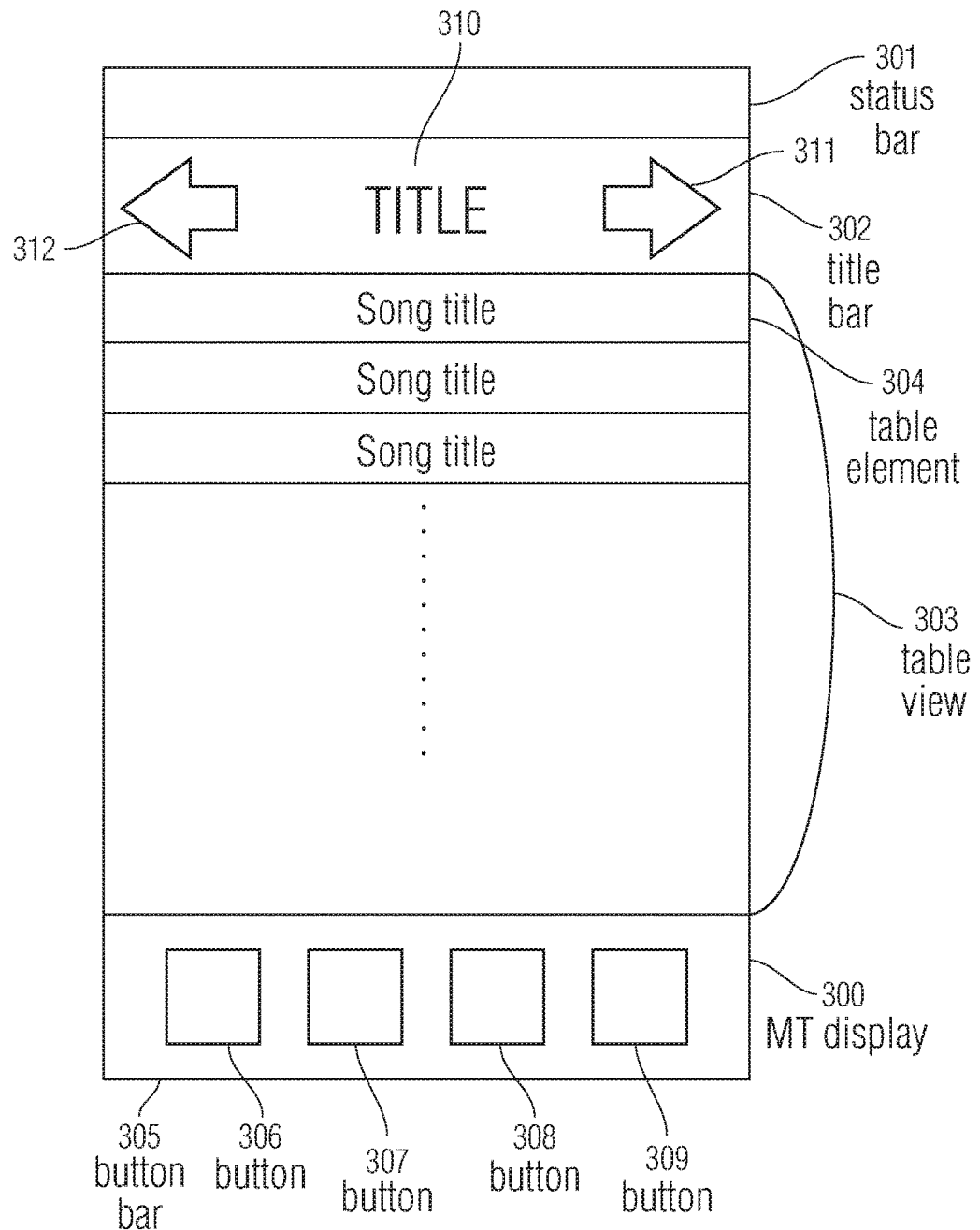
FIG. 3 is a diagram of an exemplary multi-touch display according to one embodiment of this invention.

FIG. 3 is a diagram of an exemplary multi-touch display 300. The multi-touch display can be display 203 of FIG. 2A or display 211 of FIG. 2B. The display can display various user interface elements (such as graphics, etc.) generated by software running in the device incorporating the display (e.g., device 200 of FIG. 2A or device 210 of FIG. 2B). The user can interact with the various user interface elements in order to interact with the software. When using the device of FIG. 2A, the user can interact with the user interface elements by touching them directly on the display. When using the device of FIG. 2B, the user can touch the separate multi-touch panel 212 in order to move and control one or more cursors on the display 211, the cursors being used to interact with the software.

The user interface elements rendered at the display 300 can include one or more views. Each view can represent a graphical user interface element handled by a separate software element. The separate software elements can include different applications, different processes or threads (even if within the same application), different routines or subroutines, different objects, etc. In some embodiments, each separate software element can create user interface elements for its respective portion of the display as well as receive and handle touch inputs for that portion of the display. The touch inputs can be processed by the various layers discussed in connection with FIG. 1, which can subsequently send processed touch input data to the software element (which can be part of applications 109). The processed touch input data can be referred to as touch event(s) and can be in a format that is easier to handle than raw touch data generated by the multi-touch panel. For example, each touch event can include a set of coordinates at which a touch is currently occurring. In some embodiments, the set of coordinates may correspond to the centroid of a touch. For the sake of brevity and simplicity, the discussion below may refer to a software element associated with a view by simply referring to the view itself Views can be nested. In other words, a view can include other views. Consequently, the software element associated with a first view can include or be linked to one or more software elements associated with views within the first view. While some views can be associated with applications, others can be associated with high level OS elements, such as graphical user interfaces, window managers, etc.

The exemplary display of FIG. 3 shows a music browsing application. The display can include a status bar view 301 that indicates the overall status of the device. The status bar view can be part of the OS. Title view 302 can also be included. The title view can itself include several other views, such as center title view 310, back button 312 and forward button 311. Table view 303 can also be included. Table view 303 can include one or more table element views, such as table element view 304. As seen, in one embodiment, the table element views can be song titles. A button bar view 305 can also be included. The button bar view can include buttons 306-309.

Each view and its associated software element may be able to receive, process and handle touch events that occur at that particular view. Thus, for example, if a user touches song title view 304, the software element associated with that view can receive a touch event indicating that the view has been touched, process it and respond accordingly. For example, the software element can change the graphical representation of the view (i.e., highlighting the view), and/or cause other actions such as playing a song associated with the touched view.

In some embodiments, touch events are processed at the lowest level of the view hierarchy. Thus, for example, if a user touches title bar view 302, the touch event need not be directly processed by the software element associated with the title bar view, but instead can be processed by a software element associated with a view included within the title bar view where the touch occurred (i.e., a software element associated with one of views 310, 311 and 312). In some embodiments, some higher level views can also handle touch events. In addition, various software elements that are not associated with a view being touched can nevertheless be alerted or can discover that the view is being touched.

Since display 300 is a multi-touch display, multiple touches can occur at the same time. The multiple touches can occur in the same view, or in two or more different views. Furthermore, the user can perform gestures (e.g., by pressing down one or more fingers and moving them) that can have predefined meanings. Multi-touch gestures are discussed in more detail in U.S. patent application Ser. No. 10/903,964, entitled "Gestures for Touch Sensitive Input Devices," filed on Jul. 30, 2004 and hereby incorporated by reference in its entirety.

A view can receive touch events that start within the view. If a user keeps a finger pressed against the display, then the view can receive multiple touch events indicating a continuous touch. If a user moves a pressed finger, the view can receive multiple touch events indicating movement of the touch. If a user moves a pressed finger outside of the view, then the view can still receive touch events associated with that movement (and the views to which the finger has been moved need not receive such touch events). Thus, a view can receive events associated with a gesture or a movement that begins at the view, even if it continues outside of the view.

A touch can refer to an act which begins with pressing a finger or another body part or object to the surface of a multi touch panel (or multi touch display) and ends when the finger or object is removed from the display. Thus, the touch can include moving of the finger or object, or keeping the finger or object at the same place for a period of time.

Touch events can be sent to views (or the software elements that implement the views) by one or more APIs (and their respective implementations). An example of an API for handling touch events is provided in Appendix A below. According to the API of Appendix A, the API can send each view a touch event data structure that includes one or more single touch data structures (or touch data structures). Each touch event data structure can define the current state of all touches taking place at the view at a particular moment in time. The respective touch data structures within a touch event data structure can define the current states of one or more respective single touches at the particular moment in time. Thus, if there are three touches taking place at a particular moment in time in a particular view, a touch event data structure comprising three touch data structures defining the states of the five touches can be sent to the view. In some embodiments, touch data structures can be sent even if their associated touches are no longer taking place in order to alert the view that the touches have terminated.

As noted above, a touch may include an act that need not be instantaneous. E.g., a touch can include an act of moving or holding a finger against a display for a period of time. A touch data structure, however, defines a state of a touch at a particular time. Therefore, multiple touch data structures may be associated with a single touch, thus defining the single touch at different points in time.

Each touch data structure can comprise various fields. A "first touch for view" field can indicate whether the touch data structure defines the first touch for the particular view (since the software element implementing the view was instantiated). A "time stamp" field can indicate the particular time that the touch data structure relates to.

An "info" field can be used to indicate if a touch is a rudimentary gesture. For example, the "info" field can indicate whether the touch is a swipe and, if so, in which direction the swipe is oriented. A swipe is a quick drag of one or more fingers in a straight direction. The API implementations can determine if a touch is a swipe and pass that information to the application through the "info" field, thus alleviating the application of some data processing that would have been necessary if the touch were a swipe.

A "tap count" field can indicate how many taps have been sequentially performed at the position of the touch. A tap can be defined as a quick pressing and lifting of a finger against a panel at a particular position. Multiple sequential taps can occur if the finger is again pressed and released in quick succession at the same position of the panel. Thus, the API implementation can count taps for various application and relay this information through the tap "count field." Multiple taps at the same location are sometimes considered to be a very useful and easy to remember command for touch enabled interfaces. Thus, by counting taps, the API can again alleviate some data processing from the application.

A "phase" field can indicate a particular phase the touch is currently in. The phase field can have various values, such as "touch phase began" which can indicate that the touch data structure defines a new touch that has not been referenced by previous touch data structures. A "touch phase moved" value can indicate that the touch being defined has moved from a position defined in a previous touch data structure. A "touch phase stationary" value can indicate that the touch has stayed in the same position since the last touch data structure for that touch was generated. A "touch phase ended" value can indicate that the touch has ended (e.g., the user has lifted his/her finger from the surface of a multi touch display). A "touch phase cancelled" value can indicate that the touch has been cancelled by the device. A cancelled touch can be a touch that is not necessarily ended by a user, but which the device can determine to ignore. For example, the device can determine that the touch is being generated inadvertently (i.e., as a result of placing a portable multi touch enabled device in one's pocket) and ignore the touch for that reason. Each value of the "phase field" can be a integer number.

Thus, each touch data structure can define what is happening with a touch at a particular time (e.g., whether the touch is stationary, being moved, etc.) as well as other information associated with the touch (such as position). Accordingly, each touch data structure can define the state of a particular touch at a particular moment in time. One or more touch data structures referencing the same time can be added in a touch event data structure that can define the states of all touches a particular view is receiving at a moment in time (as noted above, some touch data structures may also reference touches that have ended and are no longer being received). Multiple touch event data structures can be sent to the software implementing a view as time passes, in order to provide the software with continuous information describing the touches that are happening at the view. One or more elements of the device such as, for example, hardware 100, drivers 103, core OS 104, OS APIs 105 and UI APIs can detect touches at the multi touch panel 101 and generate the various touch event data structures defining these touches.

The ability to handle multiple touches and multi-touch gestures can add complexity to the various software elements. In some cases, such additional complexity can be necessary to implement advanced and desirable interface features. For example, a game may require the ability to handle multiple simultaneous touches that occur in different views, as games often require the pressing of multiple buttons at the same time. However, some simpler applications and/or views (and their associated software elements) need not require advanced interface features. For example, a simple button (such as button 306) can be satisfactorily operable with single touches and need not require multi-touch functionality. In these cases, the underlying OS may send unnecessary or excessive touch data (e.g., multi-touch data) to a software element associated with a view that is intended to be operable by single touches only (e.g., a button). Because the software element may need to process this data, it may need to feature all the complexity of a software element that handles multiple touches, even though it is associated with a view for which only single touches are relevant. This can increase the cost of development of software for the device, because software elements that have been traditionally very easy to program in a mouse interface environment (i.e., various buttons, etc.) may be much more complex in a multi-touch environment.

Embodiments of the present invention address the above discussed issues by selectively providing touch data to various software elements in accordance with predefined settings. Thus, a simpler interface can be provided for selected software elements, while others can take advantage of more complex multi-touch input.

Embodiments of the invention can rely on one or more flags associated with one or more views, wherein each flag or combination thereof indicates a mode of touch event processing for a particular view. For example, multi-touch and/or exclusive touch flags can be used. The multi-touch flag can indicate whether a particular view is capable of receiving multiple simultaneous touches or not. The exclusive touch flag can indicate whether a particular view is to allow other views to receive touch events while the view is receiving a touch event.

Figure 4:
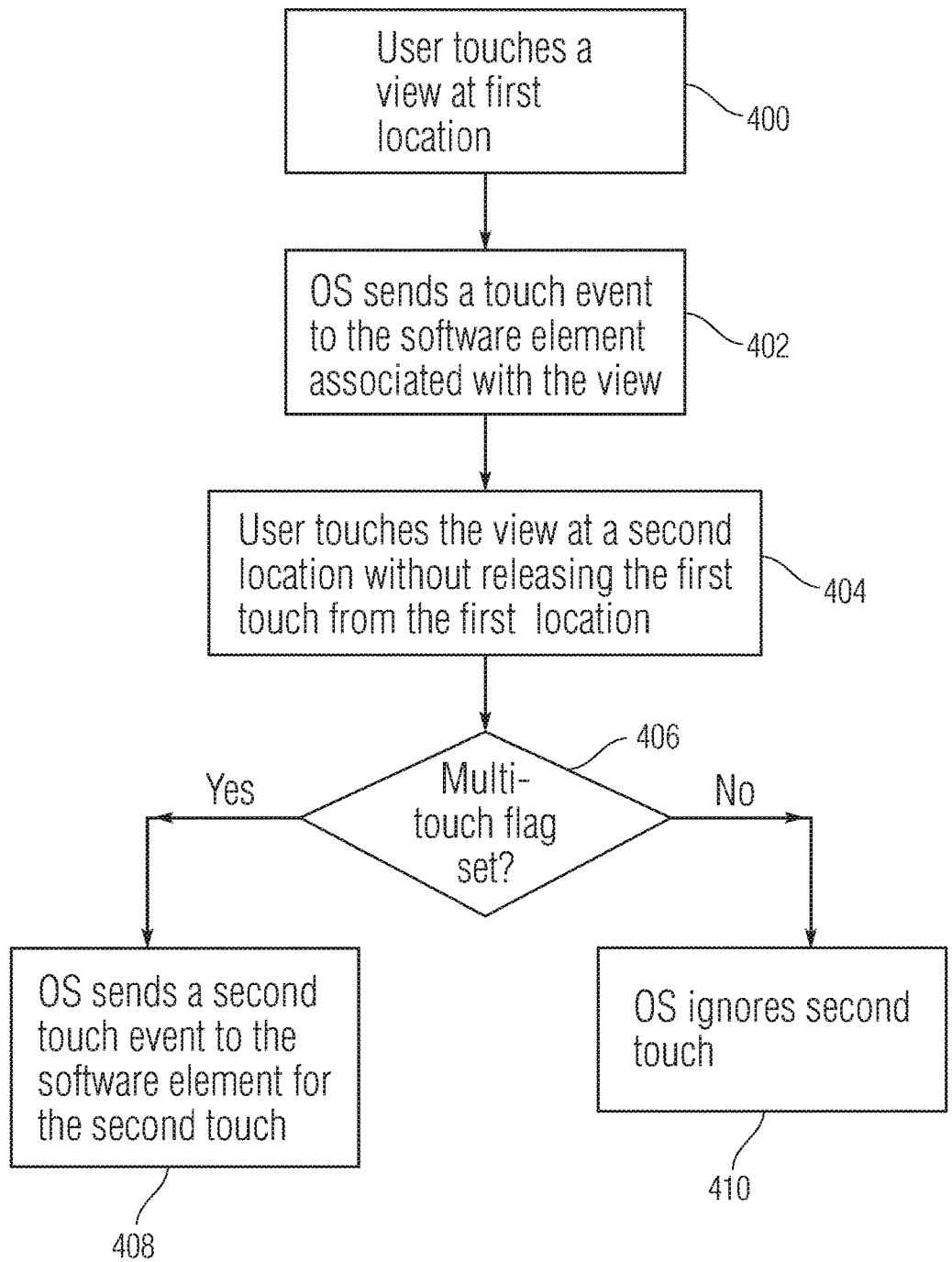
FIG. 4 is a flow chart showing an exemplary method of operation of the multi-touch flag according to one embodiment of this invention.

FIG. 4 is a flow chart showing the operation of the multi-touch flag according to one embodiment of the invention. At step 400, a user can touch a view at a first location within the view. It can be assumed that no other touches are present on the multi-touch display when the touch of step 400 is received. At step 402, the OS can send a touch event defining the received touch to a software element associated with the touched location.

At step 404, the user can touch the view at a second location while not releasing the first touch (i.e., while keeping a finger pressed down at the first location). Thus, for example, the user can touch the right portion of table element view 304 at step 400 and touch the left portion of table element view 304 at step 404 without releasing his/her finger from the right portion. Therefore, the second touch is contemporaneous with the first touch (thus taking advantage of the multi-touch capabilities of display 300).

At step 406, the OS can determine whether the multi-touch flag for the view being touched is set. If the multi-touch flag is set, then the view can be a view that can handle multiple contemporaneous touches. Therefore, at step 408, a second touch event for the second touch can be sent to the software element associated with the view. It should be noted that new instances of the first touch event can also be sent, indicating that the first touch event is still taking place (i.e., the finger at the first location has not been lifted). The new instances of the first touch event can specify different locations if the finger at the first location is moved away from that location without being lifted (i.e., if it is being "dragged" on the surface of the display).

If, on the other hand, the multi-touch flag is not set, the OS can ignore or block the second touch. Ignoring the second touch can result in not sending any touch events associated with the second touch to the software element associated with the touched view. In some embodiments, the OS can alert other software elements of the second touch, if necessary.

Thus, embodiments of the present invention can allow relatively simple software elements that are programmed to handle only a single touch at a time to keep their multi-touch flag unasserted, and thus ensure that touch events that are part of multiple contemporaneous touches will not be sent to them. Meanwhile, more complex software elements that can handle multiple contemporaneous touches can assert their multi-touch flag and receive touch events for all touches that occur at their associated views. Consequently, development costs for the simple software elements can be reduced while providing advanced multi-touch functionality for more complex elements.

Figure 5A:
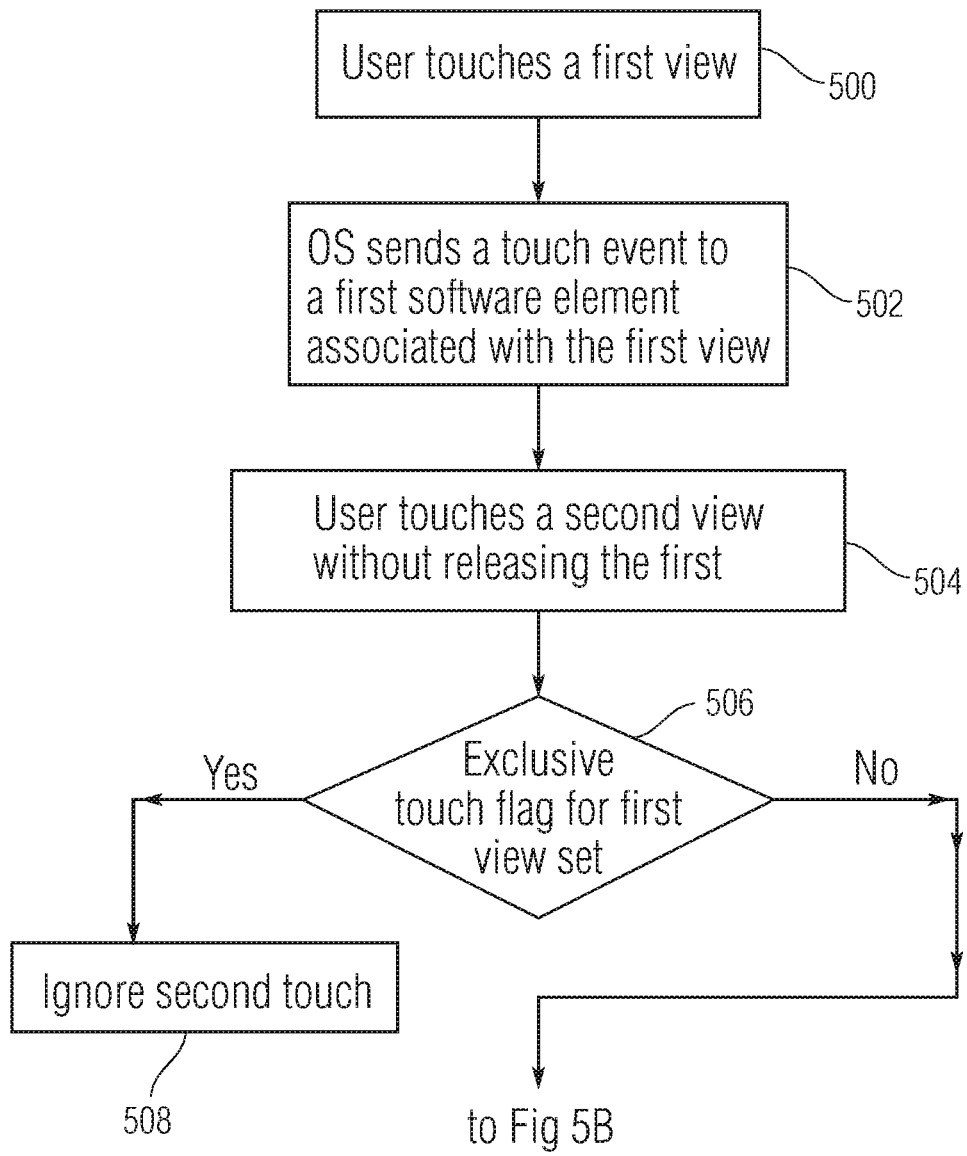
FIGS. 5A and 5B are flowcharts showing an exemplary method of operation of the exclusive touch flag according to one embodiment of this invention.
Figure 5B:
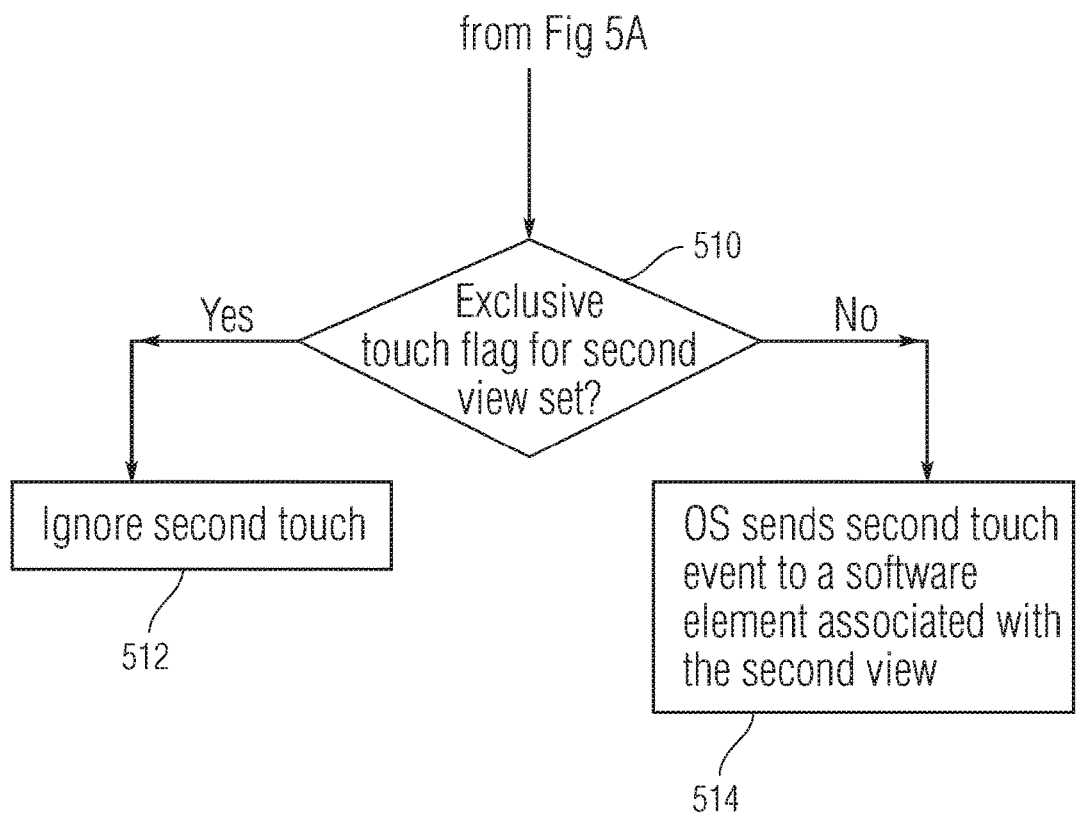

FIGS. 5A and 5B are a flow chart showing an exemplary method of operation of the exclusive touch flag according to one embodiment of the invention. At step 500, a user can touch a first view. At step 502, the OS can send a touch event to a first software element associated with the first view. At step 504, the user can touch a second view without releasing the first touch.

At step 506, the OS can check whether the exclusive touch flag for the first view is asserted. If it is set (asserted), that means that the first view needs to receive touches exclusively, and no other touches are to be sent to other views. Thus, if the exclusive touch flag is set, the OS can ignore (or block) the second touch and not send it to any software elements. If the exclusive view flag is not set, then the process can continue to step 510 of FIG. 5B.

In step 510, the OS can determine if the exclusive view flag for the second view is set. If that flag is set, than the second view can only receive exclusive touch events. Thus, if there is another touch event already being received by another view (i.e., the first view), the second view cannot receive a touch event, and the OS can ignore the second touch (step 512). However, if the exclusive touch flag for the second touch is not set (unasserted), the OS can send a touch event associated with the second touch to the second view. More specifically, the OS can send a touch event associated with the second touch to a software element associated with the second view (step 514).

Thus, the exclusive touch flag can ensure that views flagged as exclusive only receive touch events when they are the only views on the display receiving touch events. The exclusive flag can be very useful in simplifying the software of applications running on a multi-touch enabled device. In certain situations, allowing multiple views to receive touches simultaneously can result in complex conflicts and errors. For example, if a button to delete a song and a button to play a song are simultaneously pressed, this may cause an error. Avoiding such conflicts may require complex and costly software. However, embodiments of the present invention can reduce the need for such software by providing an exclusive touch flag which can ensure that a view that has that flag set will receive touch events only when it is the only view that is receiving a touch event. Alternatively, one or more views can have their exclusive touch flags unasserted, thus allowing multiple simultaneous touches at two or more of these views.

In some embodiments the exclusive flag can signify exclusivity for the entire display. Thus, when a view with the exclusive flag set is receiving a touch event, all other views in the display can be blocked from receiving any touch events. In alternative embodiments, the exclusive flag can signify exclusivity in a smaller area such as a single application, or a single window. For example, a first view with its exclusivity flag set can block other views that are in the same window from receiving any touch events while the first view is receiving a touch event, but not block views in other windows.

The exclusive touch and multi-touch flags can be combined. Accordingly, one or more views being displayed can each include two flags—a multi-touch flag and an exclusive touch flag. In some embodiments, all displayed views can include these two flags. The value of one flag need not depend on the value of another. In one example, a view with both exclusive and multi-touch flags set can allow multiple touches within the view but may only receive touches exclusively (i.e., when the view is receiving touches, touches to other views can be blocked). A view with both flags unasserted can block multiple touches within the view but allow single touches within the view even if touches are simultaneously taking place in other views. A view with the multi-touch flag unasserted and the exclusive touch flag asserted can allow only single touches within the view when no other touches are taking place in any other views. A view with the multi-touch flag asserted and the exclusive touch flag unasserted can allow all touches received for the view. A view with both flags asserted can allow multiple touches in the view while no other touches are taking place for other views.

Alternative embodiments can feature only one of the flags (and the associated functionality). Thus, some embodiments can use the multi-touch flag only or exclusive touch flag only. In some embodiments, different views can use different combinations of the flags.

The various functionalities performed by the OS in FIGS. 4, 5A and 5B can instead be performed by other software, such as various utility software. These functionalities can be performed by software at any one layer of layers 103 through 108 of FIG. 1. In an alternative embodiment, these functionalities can even be performed by hardware 100.

Provided below is an exemplary set of code showing the methods of an exemplary software element associated with a view according to some embodiments of the invention. A person of skill in the art would recognize that other code may also be used to implement the functionalities discussed above.

While the above discussion centers on multi-touch displays and panels, the present invention is not limited to multi-touch device but may include various multi-point devices as discussed above (including, for example, multi-proximity sensor devices). For multi-point devices, multi-point and an exclusive point flags can be used. These flags can operate in a similar manner to the multi-touch and exclusive touch flags discussed above.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

APPENDIX A

EXEMPLARY UI API CODE

```
@interface UIResponder
- (void)touchesBegan:(NSSet *)touches withEvent:(UIEvent *)event;
- (void)touchesMoved:(NSSet *)touches withEvent:(UIEvent *)event;
- (void)touchesEnded:(NSSet *)touches withEvent:(UIEvent *)event;
- (void)touchesCanceled;
// This method can be implemented instead of the individual
touchBegan:/touchMoved:/touchEnded:
// methods if the view author wishes to handle all associated touches
simultaneously.
- (void)touchesChangedWithEvent:(UIEvent *)event;
@end
typedef enum {
    UITouchPhaseBegan,          // whenever a finger touches the
                                   surface.
    UITouchPhaseMoved,          // whenever a finger moves on the
                                   surface.
    UITouchPhaseStationary,     // whenever a finger is touching
                                   the surface
but hasn't moved since the previous event.
    UITouchPhaseEnded,          // whenever a finger leaves the
                                   surface.
    UITouchPhaseCanceled,       // whenever a touch doesn't end
                                   but we need to
stop tracking (e.g. putting device to face)
} UITouchPhase;
enum {
    UITouchSwipedUp       = 1 << 0,  // more than one of the swipe
                                        flags can
be set if it's swiped at an angle.
    UITouchSwipedDown     = 1 << 1,  // these swipe directions are
                                        relative
to the UI orientation (see UIApplication)
    UITouchSwipedLeft     = 1 << 2,
    UITouchSwipedRight    = 1 << 3,
};
typedef unsigned int UITouchInfo;
@interface UITouch : NSObject
{
    BOOL             _firstTouchForView;
    NSTimeInterval   _timestamp;
    UITouchPhase     _phase;
    UITouchInfo      _info;
    NSUInteger       _tapCount;
    UIWindow         *_window;
    UIView           *_view;
    CGPoint          _locationInView;
    CGPoint          _previousLocationInView;
}
- (NSTimeInterval)timestamp;
- (UITouchPhase)touchPhase;
- (UITouchInfo)touchInfo;
- (NSUInteger)tapCount; // touch down within a certain point within a
certain amount of time
- (UIWindow *)window;
- (UIView *)view;
- (CGPoint)locationInView;
- (CGPoint)previousLocationInView;
@end
@interface UIEvent : NSObject
{
    CFTypeRef               _event;
    NSTimeInterval          _timestamp;
    NSMutableSet            *_touches;
    CFMutableDictionaryRef  _keyedTouches;
}
- (NSTimeInterval)timestamp;
- (NSSet *)allTouches;
- (NSSet *)touchesForWindow:(UIWindow *)window;
- (NSSet *)touchesForView:(UIView *)view;
@end
```

What is claimed is:

1. A method performed at an electronic device with a touch-sensitive surface, a processor, and memory storing one or more applications for execution by the processor, the method comprising:
    detecting one or more touches that start within a view on the touch-sensitive surface; and
    processing the one or more touches on the touch-sensitive surface with a software element associated with the view;
    receiving, at the software element associated with the view, a touch event, the touch event comprising a data structure including a phase value indicating that a respective touch on the touch-sensitive surface has been canceled by the device; and
    responding to receiving the touch event having the phase value indicating that the respective touch on the touch-sensitive surface has been canceled by the device by ignoring the respective touch on the touch-sensitive surface.

2. The method of claim 1, wherein the touch event with the phase value indicating that the respective touch has been canceled by the device is generated in accordance with a determination that a touch is inadvertently generated.

3. The method of claim 1, wherein the data structure also includes a view field indicating a view in which the respective touch was or is being received, and a location field indicating a location where the respective touch was or is being received.

4. The method of claim 1, including receiving, at the software element associated with the view, multiple touch events that correspond to the respective touch at respective times, including the touch event with the phase value indicating that the respective touch has been canceled by the device, wherein, in another one of the multiple touch events, the phase value indicates that the respective touch has begun or moved.

5. The method of claim 4, wherein the data structure in each of the multiple touch events includes a value that indicates whether the respective touch is part of a gesture.

6. The method of claim 1, wherein said ignoring is in accordance with the phase value, in the touch event, the phase value indicating that a respective touch on the touch-sensitive surface has been canceled by the device.

7. The method of claim 6, wherein the touch event comprises a second touch event that is preceded by a first touch event for the respective touch, and processing the one or more touches on the touch-sensitive surface with the software element associated with the view includes receiving and processing the first touch event for the respective touch, the first touch event comprising a first data structure including a first phase value indicating that the respective touch has begun or moved on the touch-sensitive surface.

8. The method of claim 1, wherein the phase value in the touch event is a phase value in a set of predefined phase values.

9. An electronic device, comprising:
    a touch-sensitive surface;
    a processor; and
    memory storing one or more applications for execution by the processor, the memory including instructions for:
        detecting one or more touches that start within a view on the touch-sensitive surface; and
        processing the one or more touches on the touch-sensitive surface with a software element associated with the view;

receiving, at the software element associated with the view, a touch event, the touch event comprising a data structure including a phase value indicating that a respective touch on the touch-sensitive surface has been canceled by the device; and responding to receiving the touch event having the phase value indicating that the respective touch on the touch-sensitive surface has been canceled by the device by ignoring the respective touch on the touch-sensitive surface.

10. The electronic device of claim 9, wherein the touch event with the phase value indicating that the respective touch has been canceled by the device is generated in accordance with a determination that a touch is inadvertently generated.

11. The electronic device of claim 9, wherein the data structure also includes a view field indicating a view in which the respective touch was or is being received, and a location field indicating a location where the respective touch was or is being received.

12. The electronic device of claim 9, wherein the memory includes instructions for receiving, at the software element associated with the view, multiple touch events that correspond to the respective touch at respective times, including the touch event with the phase value indicating that the respective touch has been canceled by the device, wherein, in another one of the multiple touch events, the phase value indicates that the respective touch has begun or moved.

13. The electronic device of claim 12, wherein the data structure in each of the multiple touch events includes a value that indicates whether the respective touch is part of a gesture.

14. The electronic device of claim 9, wherein said ignoring is in accordance with the phase value, in the touch event, the phase value indicating that a respective touch on the touch-sensitive surface has been canceled by the device.

15. The electronic device of claim 14, wherein the touch event comprises a second touch event that is preceded by a first touch event for the respective touch, and processing the one or more touches on the touch-sensitive surface with the software element associated with the view includes receiving and processing the first touch event for the respective touch, the first touch event comprising a first data structure including a first phase value indicating that the respective touch has begun or moved on the touch-sensitive surface.

16. The electronic device of claim 9, wherein the phase value in the touch event is a phase value in a set of predefined phase values.

17. A non-transitory computer readable storage medium storing one or more applications for execution by a processor of an electronic device, the computer readable storage medium also storing instructions for:

detecting one or more touches that start within a view on a touch-sensitive surface of the electronic device; and processing the one or more touches on the touch-sensitive surface with a software element associated with the view;

receiving, at the software element associated with the view, a touch event, the touch event comprising a data structure including a phase value indicating that a respective touch on the touch-sensitive surface has been canceled by the device; and responding to receiving the touch event having the phase value indicating that the respective touch on the touch-sensitive surface has been canceled by the device by ignoring the respective touch on the touch-sensitive surface.

18. The computer readable storage medium of claim 17, wherein the touch event with the phase value indicating that the respective touch has been canceled by the device is generated in accordance with a determination that a touch is inadvertently generated.

19. The computer readable storage medium of claim 17, wherein the data structure also includes a view field indicating a view in which the respective touch was or is being received, and a location field indicating a location where the respective touch was or is being received.

20. The computer readable storage medium of claim 17, storing instructions for receiving, at the software element associated with the view, multiple touch events that correspond to the respective touch at respective times, including the touch event with the phase value indicating that the respective touch has been canceled by the device, wherein, in another one of the multiple touch events, the phase value indicates that the respective touch has begun or moved.

21. The computer readable storage medium of claim 20, wherein the data structure in each of the multiple touch events includes a value that indicates whether the respective touch is part of a gesture.

22. The computer readable storage medium of claim 17, wherein said ignoring is in accordance with the phase value, in the touch event, the phase value indicating that a respective touch on the touch-sensitive surface has been canceled by the device.

23. The computer readable storage medium of claim 22, wherein the touch event comprises a second touch event that is preceded by a first touch event for the respective touch, and processing the one or more touches on the touch-sensitive surface with the software element associated with the view includes receiving and processing the first touch event for the respective touch, the first touch event comprising a first data structure including a first phase value indicating that the respective touch has begun or moved on the touch-sensitive surface.

24. The computer readable storage medium of claim 17, wherein the phase value in the touch event is a phase value in a set of predefined phase values.

* * * * *